United States Patent
Morabit et al.

[11] Patent Number: 6,161,292
[45] Date of Patent: Dec. 19, 2000

[54] STRING AND STRING TRIMMER OPERATION

[76] Inventors: Vincent D. Morabit, 1230 Wendy Rd., Rock Hill, S.C. 29732; Michael Z. Morabito, 136 Reid St.; Christopher J. Morabito, 654 E. Main St., both of Rock Hill, S.C. 29730

[21] Appl. No.: 09/325,775

[22] Filed: Jun. 4, 1999

Related U.S. Application Data

[60] Division of application No. 09/010,992, Jan. 22, 1998, Pat. No. 5,996,233, which is a continuation-in-part of application No. 08/656,485, May 31, 1996, Pat. No. 5,761,816.

[51] Int. Cl.$^7$ .................................................. A01D 34/416
[52] U.S. Cl. ................................. 30/276; 30/347; 428/397
[58] Field of Search .................... 30/276, 347; 428/364, 428/397, 399

[56] References Cited

U.S. PATENT DOCUMENTS

| | | |
|---|---|---|
| D. 245,757 | 9/1977 | Fisher et al. . |
| D. 249,150 | 8/1978 | Scanland et al. . |
| D. 250,648 | 12/1978 | Scanland et al. . |
| 4,054,993 | 10/1977 | Kamp et al. . |
| 4,065,913 | 1/1978 | Fisher et al. . |
| 4,118,865 | 10/1978 | Jacyno et al. . |
| 4,126,990 | 11/1978 | Fisher et al. . |
| 4,126,991 | 11/1978 | Gobin et al. . |
| 4,165,597 | 8/1979 | Scanland et al. . |
| 4,186,239 | 1/1980 | Mize et al. . |
| 4,356,686 | 11/1982 | Lessig, III . |
| 4,366,622 | 1/1983 | Loimbard . |
| 4,524,515 | 6/1985 | Oberg . |
| 4,566,189 | 1/1986 | Muto . |
| 4,571,831 | 2/1986 | White, III . |
| 4,707,919 | 11/1987 | Tsuchiya . |
| 4,825,627 | 5/1989 | Truderung . |
| 4,869,055 | 9/1989 | Mickelson . |
| 4,905,465 | 3/1990 | Jones et al. . |
| 5,048,278 | 9/1991 | Jones et al. . |
| 5,220,774 | 6/1993 | Harbeke et al. . |
| 5,424,128 | 6/1995 | Fogle . |
| 5,524,350 | 6/1996 | Boland . |
| 5,761,816 | 6/1998 | Morabit et al. . |

FOREIGN PATENT DOCUMENTS

| | | |
|---|---|---|
| 0 011 175 | 11/1978 | European Pat. Off. . |
| WO 97/19584 | 6/1997 | WIPO . |

OTHER PUBLICATIONS

"Mechanics of Fluids," Second Edition, Shames, McGraw–Hill Book Company, 1982, pp. 405–413 and Figure 10.18.

Scientific American, Jan., 1997 "Tackling Turbulence with Super Computers".

*Primary Examiner*—Hwei-Siu Payer
*Attorney, Agent, or Firm*—Nixon & Vanderhye P.C.

[57] ABSTRACT

An elongated flexible cutting string, or substantially self-supporting strut cutting element, is connectable to a rotating device for use in a method of cutting vegetation. The cutting string has numerous advantages over conventional cutting strings, having a drag coefficient which is at least about 5% (e.g. 10–300%) less than the drag coefficient of a string having a substantially round and smooth cross-section. The drag coefficient of aerodynamic line 10 is 1.0 or less, e.g. about 0.35 or less. The cross-sectional configuration preferably simulates a tear drop (with or without an extension nose), and can have a textured (e.g. with golf ball simulating dimples, saw toothed or a wavy configuration) exterior surface. The pitch of the line is positively maintained while it is rotated in a cutting plane, e.g. controlled with an eyelet and/or a compound taper. Other cross-sectional configurations are an ellipse of at least 1.25:1 ratio, those that simulate a spearhead, keyways of different sorts, a diamond with rounded apices, or an ice cream cone. When a single string having a dimension perpendicular to the direction of movement of about 0.08 inches is rotated it uses less than the theoretical equivalent of 200 watts of power at about 9000 rpm for a 14 inch swath and 3.5 inch diameter rotating head.

20 Claims, 28 Drawing Sheets

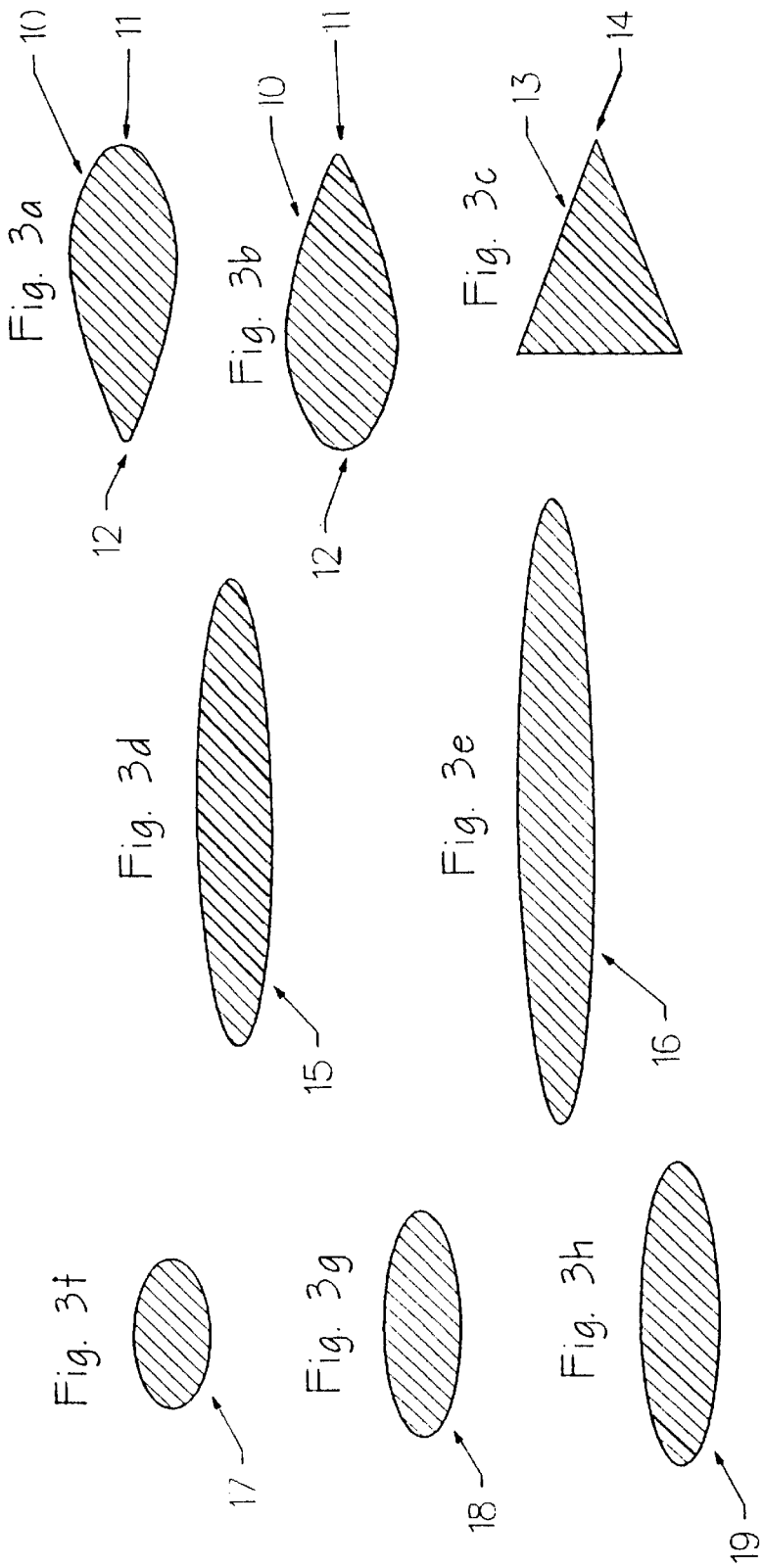

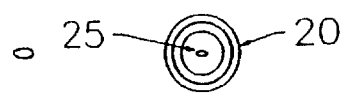
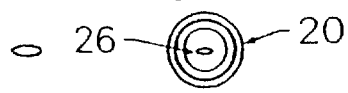
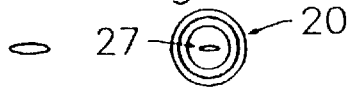
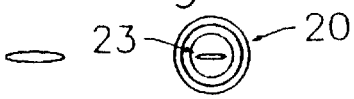
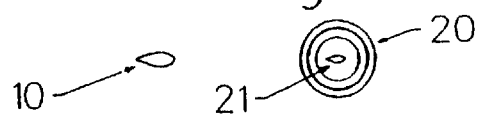
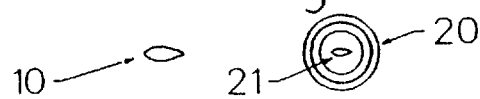
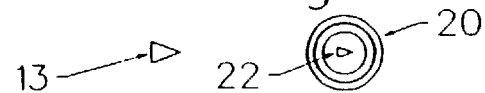

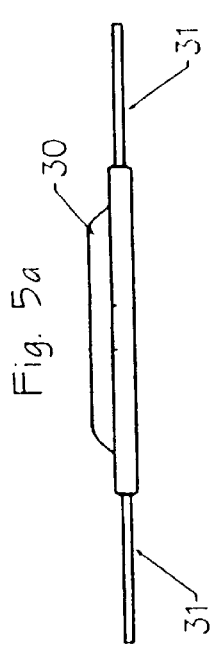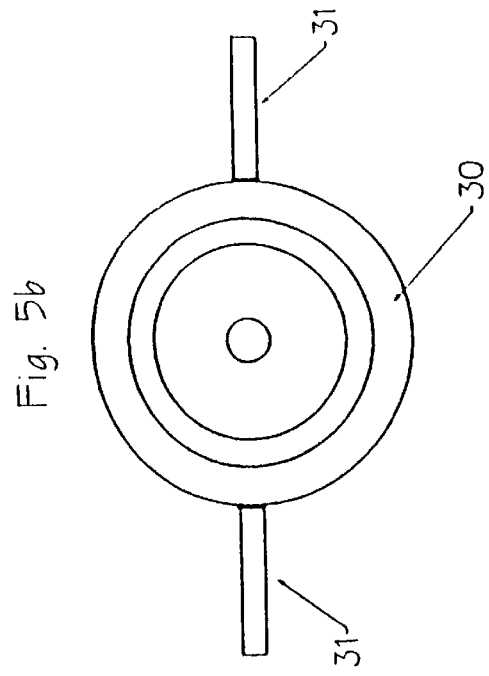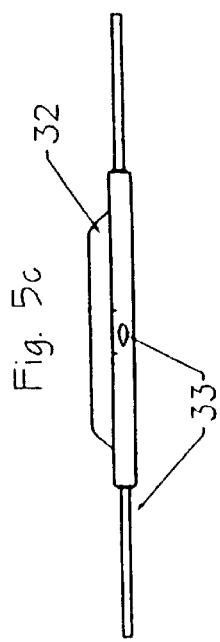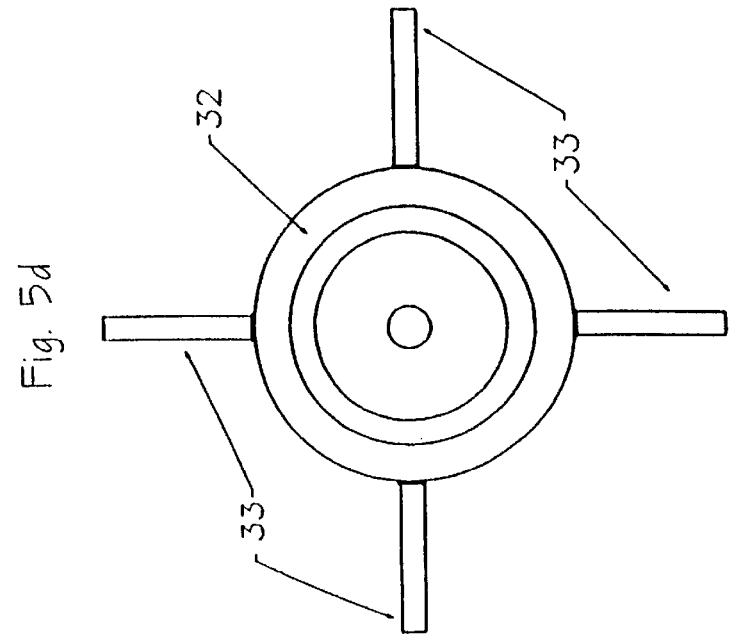

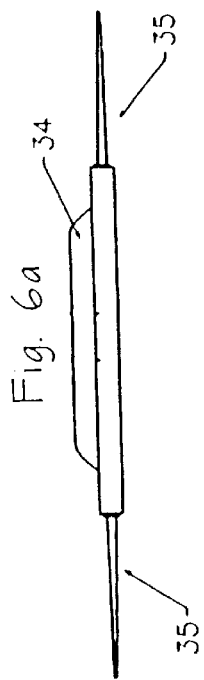
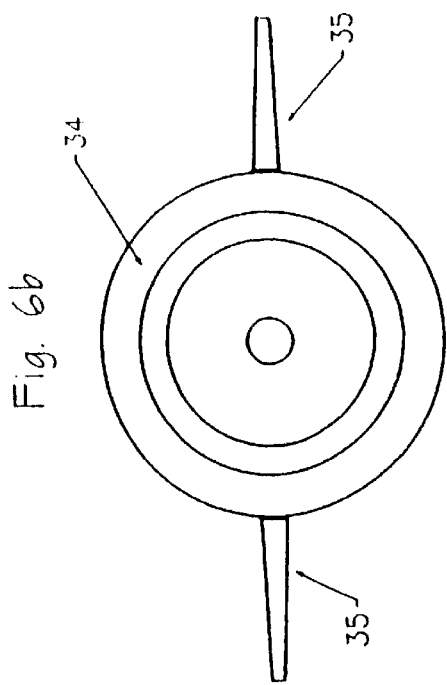
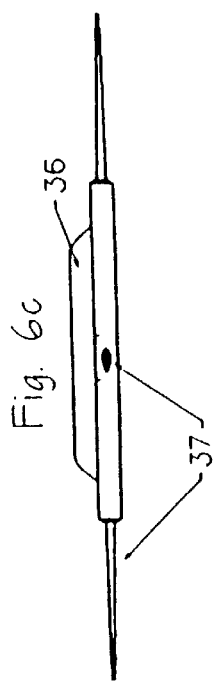
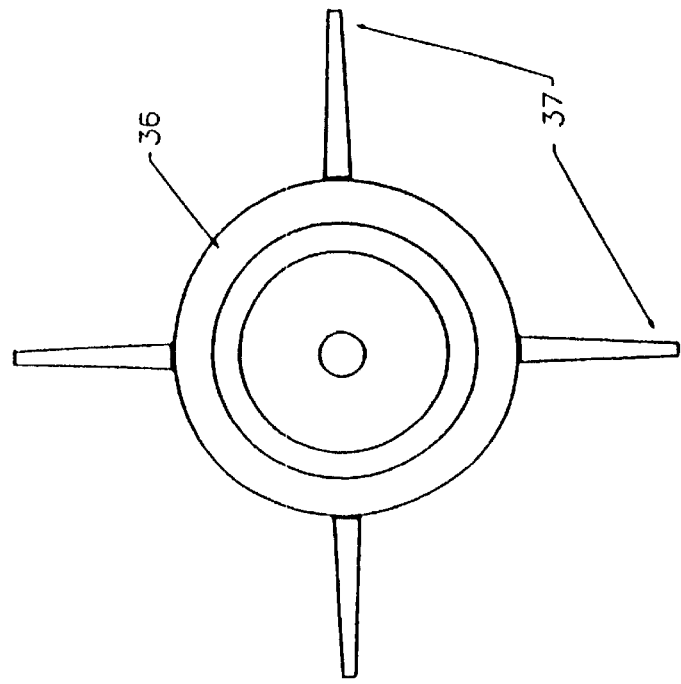

STRING AND STRING TRIMMER OPERATION

CROSS REFERENCE TO RELATED APPLICATION

This is a divisional of application Ser. No. 09/010,992, filed Jan. 22, 1998, now U.S. Pat. No. 5,996,233 which in turn is a CIP of Ser. No. 08/656,485 filed May 31, 1996, now U.S. Pat. No. 5,761,816.

BACKGROUND AND SUMMARY OF THE INVENTION

The present invention generally relates to the field of lawn care, grass and weed cutting apparatus and methods and more particularly, is directed to a flexible but rigid aerodynamic cutting string for use with such devices and methods as flexible line trimmers and the like.

Heretofore, there have been many cutting methods and devices for maintaining well-manicured lawns and grass areas, particularly adjacent buildings, fence lines and other obstacles protruding from the turf above the grass to be cut. Maintaining grass and weed areas along roadways, bankments and generally uneven surfaces also present particular problems to those responsible for their maintenance.

Present-day grass and weed cutting tools have not been without difficulties in that they are laborious and time consuming to use. Such tools include manually operated shear disk and scissor type devices mounted on extended handles. In other prior art cutting tools, a gasoline engine or electric motor is assembled to a wheeled frame and is used to drive a rotating blade in a vertical or inclined plane for cutting grass and weeds, particularly along the sides of buildings. Such a tool is expensive and can be dangerous to operate.

The availability of small electric motors and gasoline engines have lead to the development of improved grass cutting tools. Many of the tools take the form of a high speed rotating metal blade or flexible cutting line mounted on an extended handle. Conventional flexible line trimmers employ the use of flexible cutting line intended to cut grass, weeds, and vines in areas not intended or not possible for such devices as the walk-behind or ride-on lawn mower.

Through years of development, Original Equipment Manufacturers have developed flexible line cutters into one of the most widely used tools for grass cutting and care. Prior art flexible cutting line for flexible line trimmers include several attempts at providing a means to more efficiently, and cleanly, cut grass and weeds by providing generally cylindrical, round, star, triangle, and indented square shaped cutting line, none of which employ the concept of aerodynamic maximization, or attempt to control its longer axis into the plane of the cut.

The wetted surface area facing the air flow and total contour plays an important role in how air flows over a rotating cutting line. As the string is rotated on currently designed trimmers, a laminar flow is created, with a disruptive zone at the trailing side of the cutting edge of the line. The disruptive zone includes a pressure differential, and further creates a wake which leaves behind eddy disturbances for the next string to flow through. The pressure differential, in essence, pulls the string backwards.

The engine attempts to propel the string forward but the pressure differential negates a portion of the energy due to the creation of a separating type air foil from its boundary. Further, the eddy's and turbulent and/or laminar conditions created by the wake trailing the cutting line add additional forces to the forward entry path of the next forward moving line.

According to the invention it has been found that air drag and subsequent flow conditions play an important role in cutting efficiency and energy consumption in line cutting devices. Higher air drag and disturbed flow conditions leads to lower tip speed, lower fuel efficiency, and erratic line bending because more power has to be exerted in order to maintain proper and effective cutting speed. Air drag increases as the line size (diameter) increases from 0.050" to 0.130", and higher, but increases even more dramatically when sharper shapes such as square, star and cross lines are used. Therefore, as size increases and shape changes to more square or sharper cutting lines or more acute angular changes, the fuel efficiency further decreases, and the fuel usage increases. In contrast, by reducing the air drag on the string, speed will increase, as will energy efficiency as well as reduced environmental emissions.

The cutting elements and methods of the invention, aside from aerodynamic improvements, create additional benefits in reducing wear (a longer wearing surface with increased cross-sectional area compared to conventional line), increasing stiffness (a longer, more structural beam in the operating direction which increases the moment of inertia (I) of the formula–Stress=Moment*c/I), and creating a sharper cutting surface than circular shaped cutting line.

According to one aspect of the present invention an elongated flexible cutting string connectable to a rotating device for cutting vegetation is provided. The flexible cutting string has an aerodynamic cross-sectional configuration over at least a significant length (typically more than 80% of the length) thereof, including a maximum cross-sectional dimension and a minimum cross-sectional dimension typically less than 85% of the maximum cross-sectional dimension, and the configuration having a drag coefficient which is at least 5% less (preferably at least 10–300% less, e.g. about 50–200% less) than the drag coefficient of a string having a substantially round and smooth cross-section. For example, the string of the invention has a $C_D$ (drag coefficient) of 1.0 or less, e.g. 0.8 or less, preferably 0.6 or less, and most preferably about 0.35 or less.

The cross-sectional configuration may comprise a wide variety of shapes, perhaps the most simple of which is a simulation of the tear drop. The tear drop may have a textured (i.e. non-smooth on a macroscopic level) exterior surface, such as aerodynamic dimples (such as in a golf ball), a saw-tooth configuration, or an exterior surface wavy configuration. Other cross-sectional configurations include an ellipse with a ratio of at least 1.25:1 (preferably at least about 2:1, e.g. about 8:1), simulating a spearhead (comprising a small cross-sectional area rectangle merging into a large cross-sectional area trapezoid), simulating a keyway (having a small diameter circle merging into a large diameter circle, or having a small cross-sectional area trapezoid merging into a larger cross-sectional area trapezoid of substantially the same shape), simulating a diamond with rounded apices, or simulating an ice cream cone (e.g. having a small cross-sectional dimension substantially a cone-shaped portion merging into a larger cross-sectional dimension substantially parabola shaped portion). The elongated flexible cutting string preferably is primarily (that is at least 50.1%) or substantially (i.e. at least 90%) non-metallic, e.g. polymeric plastic, such as nylon, or other conventional reinforced polymeric plastics for such purpose, or rubber or rubber-like materials, or both plastic and rubber-like materials, and may have reinforcing fibers, or fillers, or other materials therein.

According to another aspect of the present invention a cutting element for cutting vegetation, which may be in the form of a flexible string or a substantially self-supporting (that is semi-flexible) strut, is provided comprising: An elongated substantially solid body comprising more than 50% polymeric material, and having a generally tear drop shaped cross-sectional area, and an exterior surface. The exterior surface may be textured, such as having aerodynamic dimples formed over the majority thereof, or having a wavy configuration. By using such "textures" the flow boundary layer is kept closer to the cutting element than if it were smooth, and separates more on the rear side of the cutting element instead of more toward the top or front. Therefore the pressure differential (perhaps even negative pressure at the rear) that exists from the front to the rear of the cutting element in the direction of rotation will be lower, thus creating a lower drag force. This occurs at the same Reynolds number. The dimpled (or other textured) configuration of the cutting element according to the invention will have a lower coefficient of drag (at least about 10% lower, preferably about 20% or more lower) because the dimples (or other texturing) change the separation flow to a point further to the rear of the profile.

While not nearly as advantageous as the strut configurations according to the invention, the golf ball simulating dimples may also be utilized in a conventional substantially circular cross-section cutting string. That is according to another aspect of the present invention there is provided a primarily polymeric plastic elongated cutting element having a substantially circular cross-section and an exterior surface, and golf ball simulating dimples formed over the majority (or substantially all) of the exterior surface.

According to another aspect of the present invention a method of cutting vegetation using at least one elongated flexible string having a beam-like structure with a first axis which is the strongest axis and has the highest moment of inertia, and a second, weaker, axis, is provided. The method comprises the steps of: (a) Rotating the elongated string about an axis of rotation so that the first axis of the beam-like structure thereof is positively mounted or controlled (e.g. by an eyelet with the same cross section as the string, by the natural forces acting on such a high inertia element, and/or by a compound taper of the string with longest cross-section at the rotating head, etc.) moves in a cutting plane. And, (b) bringing the rotating string into contact with vegetation so that the cutting plane is generally transverse to a portion of the vegetation to be cut, and the string cuts the vegetation.

The string may have an exterior surface with aerodynamic surface texturing, in which case step (a) is practiced to rotate the string so that the drag coefficient thereof is at least 10% less (preferably at least about 20% less) than if step (a) were practiced with an identical string having no surface texturing.

Step (a) may be practiced so that the drag coefficient of a single string is 1.0 (preferably 0.8, or 0.6, or 0.35, or less). For example, step (a) may be practiced on a theoretical or calculated basis by rotating a single string having a dimension perpendicular to the direction of movement of about 0.08 inches so as to use less than the equivalent of 200 wafts of power at about 9000 rpm for a 14 inch swath and 3.5 inch rotating head diameter; or by rotating a single string having a dimension perpendicular to the direction of movement of about 0.08 inches so as to use less than the equivalent of 0.4 horsepower at about 8000 rpm for a 17 inch swath and 4.5 inch rotating head diameter, or by rotating a plurality of strings each having a dimension perpendicular to the direction of movement of about 0.08 inches so as to use less than the equivalent of 0.4 horsepower at about 8000 rpm for a 17 inch swath, and 4.5 inch rotating head diameter, per string. The equivalents can be calculated, at least approximately, utilizing the following equations:

Drag=½ ρ $AC_D V^2$ and

HP=Drag•V/550

Where:

$C_D$=coefficient of drag

ρ=density of air

V=velocity=w•r

Area=D•Δr

D=diameter (largest cross-sectional dimension) of line; and

Δr=radius extending from trimmer head.

Therefore HP=½ ρ A $C_D$ $V^3$/550 or $$HP = \frac{1}{1100}\rho(D \cdot \Delta r)C_D(wr)^3$$

or $$HP = \frac{1}{1100}\rho(D)C_D w^3 \int r^3 \Delta r$$

For a typical substantially tear drop shaped strut, where the length is four times the thickness, the maximum coefficient of drag is estimated about 0.35 while in laminar flow conditions, whereas for a (macroscopically) smooth surfaced circle $C_D$=about 1.2 (the lowest conventional string $C_D$). If the diameter equals 0.095 inches and r equals eight inches, then the theoretical horsepower required to power the circular cross-section string is 0.3175 whereas the horsepower to power the tear drop shaped string is 0.0926.

Where step (a) is practiced by rotating a generally tear drop cross-sectional string, the tear drop cross-section can be rotated in one of two ways. As the tear drop cross-section string has a larger more rounded leading end, and a smaller more pointed trailing end, step (a) may be practiced by rotating the string so that the larger more rounded end provides the cutting edge of the string so that the larger more rounded end comes into first contact with the vegetation, or step (a) may be practiced by rotating the string so that the smaller more pointed end provides the cutting edge of the string and therefore first comes in contact with the vegetation. Or, the at least one string may comprise a plurality of flexible strings each having a beam-like structure with first and second axes, and step (a) may be practiced to rotate all of the plurality of strings so that the first axis of the beam-like structure of each is positively substantial and will move in substantially the same cutting plane. For example the plurality of strings may comprise at least three strings, e.g. four strings, so that step (a) is practiced to rotate the at least these strings with the first axis of each positively maintained in substantially the same cutting plane.

Because less power is necessary in order to move a same dimensioned string at a given RPM according to the invention, it is possible to either increase the number of flexible strings that can be powered by conventional engines, or increase the cutting diameter of the lines, or use smaller and lighter weight engines in the future, or use more portable battery powered or electric units, or convert conventional two cycle engines to less polluting two or four cycle engines. Also various modifications of each of these may be employed. For example the plurality of strings may comprise at least three strings, with step (a) practiced to rotate the at least three strings with the first axis of each in substantially the same cutting plane using a conventional approximately twenty-five cc gasoline powered two cycle engine, or a comparable four cycle engine.

Step (a) may be practiced by providing a rotating head, with an eyelet through which the string extends, the eyelet having a substantially identical cross-sectional configuration to the string, and powered by powering the rotating head with a power source. The rotating head may be powered by a battery or electric powered power source easily portable and usable by an average adult human.

According to another aspect of the present invention a method of cutting vegetation using one or more elongated or substantially non-metallic (e.g. primarily polymeric) flexible strings having an aerodynamic profile in a cutting plane, is provided. The method comprises the steps of:

(a) Rotating the one or more primarily or substantially non-metallic flexible elongated strings having a dimension perpendicular to the direction of movement of about 0.08 inches about a common axis of rotation so that the aerodynamic profile of each moves in a common cutting plane so as to use less than the theoretical equivalent of 0.4 horsepower at about 8000 rpm for a 17 inch swath, 4.5 inch diameter rotating head per string. And, (b) bringing the one or more rotating primarily or substantially non-metallic flexible strings into contact with vegetation so that the common cutting plane is generally transverse to a portion of the vegetation to be cut, and the string cuts the vegetation. For example step (a) may be practiced by providing a rotating head, with an eyelet for each string through which the string extends, the eyelet having substantially an identical cross-sectional configuration to the string; and by powering the rotating head with a power source so that the head rotates, at least when the one or more strings are not in contact with vegetation, at the equivalent of between about 6000–9000 rpm for a 17 inch swath.

According to the present invention cutting strings which have improved aerodynamic operation over such strings known in the prior art are provided. Cutting strings according to the present invention also can have improved durability by reducing wear over such strings known in the prior art, are easy to use, and low in cost, and have reduced cost of operation as a result of energy or fuel savings compared to conventional strings, and are easy to manufacture.

The invention includes a number of embodiments which eliminate or greatly reduce the drag, fluttering and force-imbalances which are created as a result of the pressure differential and wake which are formed behind the flexible line as it moves. This is achieved by employing an aerodynamic profile for the line which lowers the coefficient of drag and reduces the forces created by the air foil, or by producing conventionally shaped strings with drag-reducing texturing. The invention also encompasses related components, such as the rotating head, the eyelet and string spool.

The present invention can be used with continuous length (extruded) or fixed length (injection molded) flexible lines, formed of aerodynamic connecting links, pre-cut lengths of flexible line, and/or other moving, less flexible, cutting attachments. In addition, the aerodynamic cutting string of the present invention can be employed with single, double, triple, quadruple or multiple line heads of any given diameter.

It is the primary object of the present invention to provide a more efficient cutting string or other cutting element for a rotating head trimmer or the like, and a highly efficient method of cutting vegetation using such a string. This and other objects of the invention will become clear from an inspection of the detailed description of the invention, and from the appended claims.

BRIEF DESCRIPTION OF THE DRAWINGS

FIGS. 3a–3h illustrate cross-sectional views of various shapes and sizes of a straight (uniform cross-section, as in FIGS. 5a and 5d), or compound tapered (largest cross-section at head, as in FIGS. 6a–6d) aerodynamic string in accordance with the present invention;

FIGS. 4a–4h illustrate mating trimmer head exit port eyelets which correspond to the aerodynamic string shapes and sizes illustrated in FIGS. 3a–3h, respectively;

FIGS. 5a–5d and 6a–6d illustrate preset line cartridges which employ a straight (uniform cross-section, as in FIGS. 5a–5d), or compound tapered (largest cross-section at head, as in FIGS. 6a–6d) aerodynamic string in accordance with the present invention;

DETAILED DESCRIPTION OF THE DRAWINGS

Figure 1:
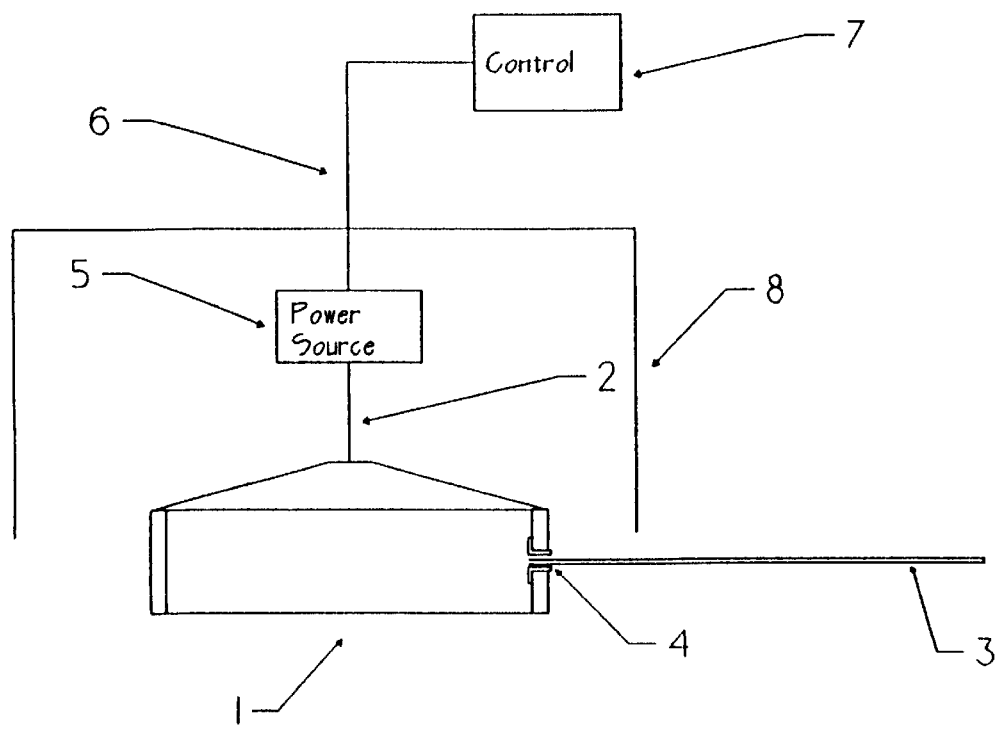
FIGS. 1 and 2 are side and bottom views illustrating the overall construction of a string trimmer and spool head.

The present invention incorporates the design of the cross sections of the flexible cutting line to be shaped in such a manner so as to reduce or minimize the effects of aerodynamic drag, vortex and eddy disturbances, and/or force imbalances which tend to destabilize the flexible line during rotation, thus creating instability. Linear velocities of such a rotating flexible cutting line vary in certain locations along the line. Accordingly, the cross section of the cutting line can vary to maximize the intended benefits at various speeds and locations.

In general the aerodynamic line according to the invention has a beam or strut-like cross-section (an elongated shape such as tear drop, ellipse, or complex shapes as hereafter described), and a minimum cross-sectional dimension less than 85% of the maximum cross-sectional dimension, or for an ellipse at least a 1.25 to 1 ratio (e.g. 2:1 to 8:1) and movement in a direction perpendicular to the smaller dimension, and/or drag-reducing surface texturing.

Various styles of elliptical cross sections of the line create an assortment of sharper cutting edges. Such a design is in contrast to the hemisphere shape of a circular cutting line. The grass and weeds that are cut by the line are cut smoother and easier at lower speeds and the line itself, due to the substantially reduced aerodynamic resistance, larger cross-sectional area with the longer length member in the cutting plane, will last longer than circular cutting line.

In accordance with the present invention, the leading edge of the flexible line can be controlled by its positioning through the eyelet of the rotating cutting head. Therefore, the eyelet can be shaped to the same cross-sectional design (with sufficient clearance) to allow the flexible line to pass through for feeding. This can be done with either single or multiple lines.

The surface along the axis of the flexible line is specially modified to produce further stability as the line moves rapidly through the air. Recessed or elevated ribs also can be added to help straighten air flow and reduce trailing wake disturbances.

The retaining spool which holds pre-wound string is also designed to accept the various flexible line cross-sections in such a manner to help feed and keep it oriented toward its intended direction, either in part or in combination with the eyelet cross-section. Any combination can achieve its intended exposure to the air by control at the eyelet discharge. The eyelet at the discharge is also designed to change its orientation so as to allow the line pitch to be adjusted and feathered to a preferred or more desirable position.

The string of the present invention is made of either a continuous piece of flexible line or in components such as with aerodynamic links. With the link design, variable modifications can be made to the cross-sectional areas as it would be exposed to the air, so as to meet different velocity conditions along the outward radius of the rotating flexible string. Such a construction also accommodates for varying velocities along the length of the cutting unit.

The same concepts can be applied to present-day string advance mechanisms and cutoff knives which would trim the excess line after advancing has been made to the desired cutting length.

The advantages of aerodynamic string of the present invention is that it utilizes the best principles associated with reducing dynamic air drag, vortex and eddy disturbances, imbalanced forces, erratic flow zones, flexible line resonance, among other factors. These imbalances are eliminated, or greatly reduced, by the design of the cutting line cross-section, which results in lower pressure differential, reduction or elimination of wake disturbances, smoother operation, lower power required, and much greater operating efficiency. Therefore, more grass and weeds can be cut with less fuel or energy required while the operator experiences more comfort and less fatigue. The present invention also has the advantage of reducing stress to the line itself, therefore resulting in longer cutting life.

The cutting string of the invention is designed to reduce air drag and fuel consumption, while at the same time maintaining or improving cutting efficiency and durability. Since 1987, at least 30 million string trimmer and brush cutter units have been sold. A conservative estimate would be that 50% of these are still in use today, or 15 million, and they use flexible line as a cutting medium. If, for example, these 15 million homeowners use trimmers with aerodynamic strings which incorporate the present invention 30 minutes per week during summer months and that the aerodynamic string saves an average of two fuel ounces per 30 minutes of use, a savings of 480 million ounces, or 3.75 million gallons of fuel, would result per year.

The aerodynamic string of the present invention also provides an additional benefit to flexible line cutter manufacturers. The addition of inventive string to present string cutting lines would increase cutting speed and overall cutting performance. As explained above, Applicants' string greatly reduces air drag, allowing the use of lower horsepower engines. Thus, OEMs could cut manufacturing cost by providing lower horsepower engines while at the same time maintaining or increasing cutting efficiency, and reducing noise attributed to higher horsepower, higher speeding engines, noise created by the string itself, and reducing pollutants emitted to the environment. Accordingly, the use of the invention results in a lighter weight, more quiet and compact cutting device compared to today's trimmer that uses conventionally designed cutting line. Also, battery powered power sources may be more easily carried and utilized by an average adult human, while eliminating the problems associated with earlier devices.

Figure 2:
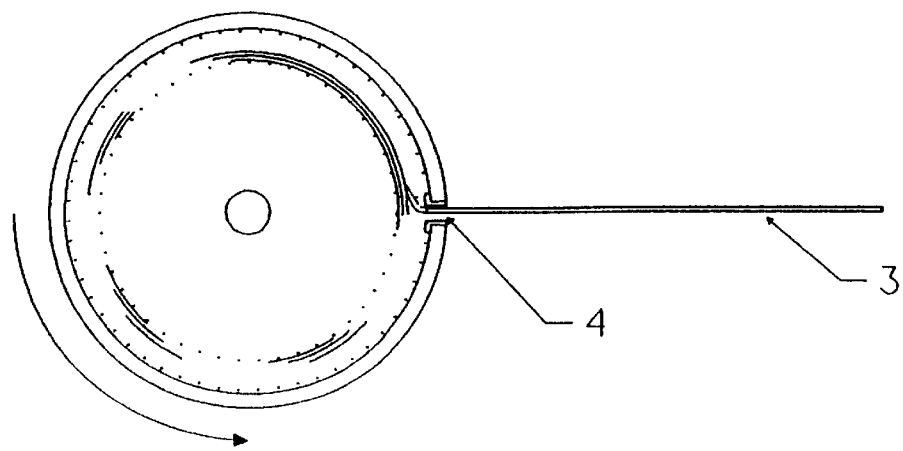

FIGS. 1 and 2 illustrate the overall construction of a string trimmer head assembly. The trimmer head assembly includes a rotating head 1 which is rotatable about shaft 2 via a bearing assembly (not shown) as is well known in the prior art. The bearing assembly provides relatively friction-free rotation of head 1 about shaft 2. Included within head 1 is a supply of trimmer string 3 which projects from head 1 via eyelet 4. The shaft 2 is rotated by a conventional power source, shown schematically at 5, such as a 25 cc gasoline powered engine, an electric motor plugged into a 120 volt line, or an electric motor powered by a portable battery pack. The power source 5 is typically mounted by a conventional handle, shown schematically at 6, with operating levers, switches, or triggers, shown schematically at 7, mounted thereon. The head 1 also can be mounted within a protective housing shown schematically at 8 in FIG. 1. For example the components 5–8 may be as illustrated in U.S. Pat. No. 4,707,919, the disclosure of which is incorporated by reference herein.

FIGS. 3a–3h illustrate various shapes and sizes of the aerodynamic cutting string of Applicants' invention. Selection of the optimum shape and size for minimized drag and maximum cutting efficiency and durability will depend on the size of the trimmer motor and the particular cutting operation to be performed.

FIG. 3a shows a cutting string 10 having a tear drop configuration, with a leading, cutting, edge 11 and a trailing edge 12. FIG. 3b shows a cutting line 10 having the same tear drop configuration of FIG. 3a only in reverse, the cutting edge 11 being the more tapered edge while the trailing edge 12 is a larger edge, compared to the FIG. 3a configuration. FIG. 3c shows a triangle cross-section of the cutting string having a cutting edge 14. FIG. 3d shows a 6:1 ellipse cross-section cutting string 15, FIG. 3e shows an 8:1 elliptical cross-section cutting string 16, FIG. 3f shows a 2:1 ellipse cross-section of the cutting string 17, FIG. 3g shows a 3:1 ellipse, cross-section cutting string 18, and FIG. 3h shows a 4:1 ellipse cross-section cutting string 19.

Each size and shape of strings 10–19 corresponds to a particular size and shape of an eyelet as illustrated in FIGS. 4a–4h, respectively. In this regard, each eyelet is designed so that it can be easily removed from trimmer head 1 and replaced with a different eyelet which matches the string to be used.

FIGS. 4a–4h show different eyelets 20 according to the invention, the eyelet configurations, such as the configurations 10, 13 as seen in FIGS. 4a and 4b, and FIGS. 4c, respectively, corresponding to the same shapes as the cutting string cross-sections illustrated in FIGS. 3a–3h, respectively. That is the eyelets 21 in FIGS. 4a and 4b have tear drop and reverse tear drop configurations, the eyelet 22 in FIG. 4c a triangular configuration, the eyelet 23 in FIG. 4d a 6:1 ellipse configuration, the eyelet 24 in FIG. 4e an 8:1 ellipse configuration, the eyelet 25 in FIG. 4f a 2:1 ellipse configuration, the eyelet 26 in FIG. 4g a 3:1 ellipse configuration, and the eyelet 27 in FIG. 4h a 4:1 ellipse configuration.

FIGS. 5a and 5b show a universal preset line cartridge 30 having two aerodynamic cutting strings 31 according to the invention extending outwardly therefrom. In the embodiment of FIGS. 5c and 5d, which are side and top plan views of a preset line cartridge 32, four aerodynamic cutting strings 33 are provided, the strings 33 being substantially equally placed around the circumference of the cartridge 32 as seen most clearly in FIG. 5d.

FIGS. 6a and 6b show a preset line cartridge 34 similar to that in FIGS. 5a and 5b except that the aerodynamic cutting lines 35 associated therewith are progressively tapered, yet still aerodynamic in cross-section, as can be seen in both FIGS. 6a and 6b. The embodiment of FIGS. 6c and 6d is the same as that in FIGS. 5c and 5d except that the cartridge 36 has cutting strings 37 like those illustrated at 35 in FIGS. 6a and 6b, namely the strings are progressively tapered, yet still aerodynamic in cross-section.

The cutting line of the invention can be made of primarily or substantially non-metallic material, such as high strength polymer or other material having similar characteristics. Some examples include nylon, Delrin, polyester, fiberglass, rubber, or rubber-like materials, and mixtures or combinations thereof.

Figure 7:
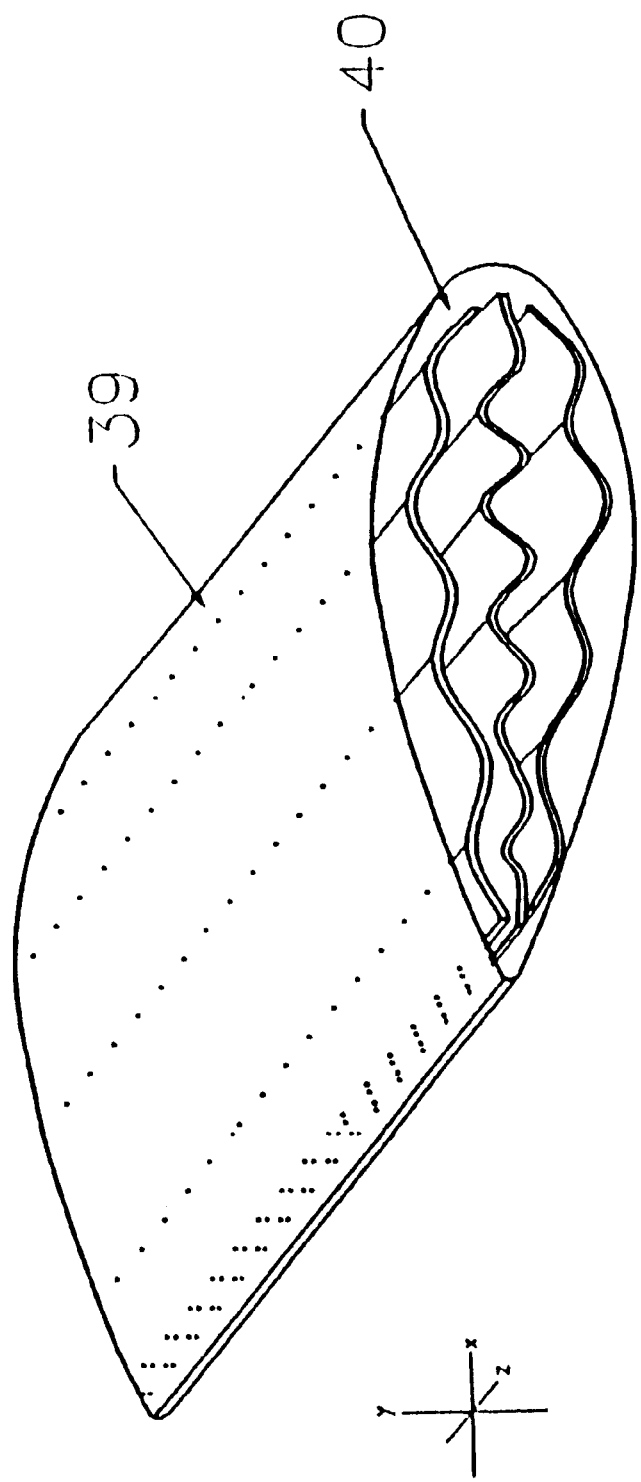
FIGS. 7 and 8 illustrate various methods of manufacturing an aerodynamic string to increase abrasion resistance and take higher stress in accordance with the present invention.
Figure 8:
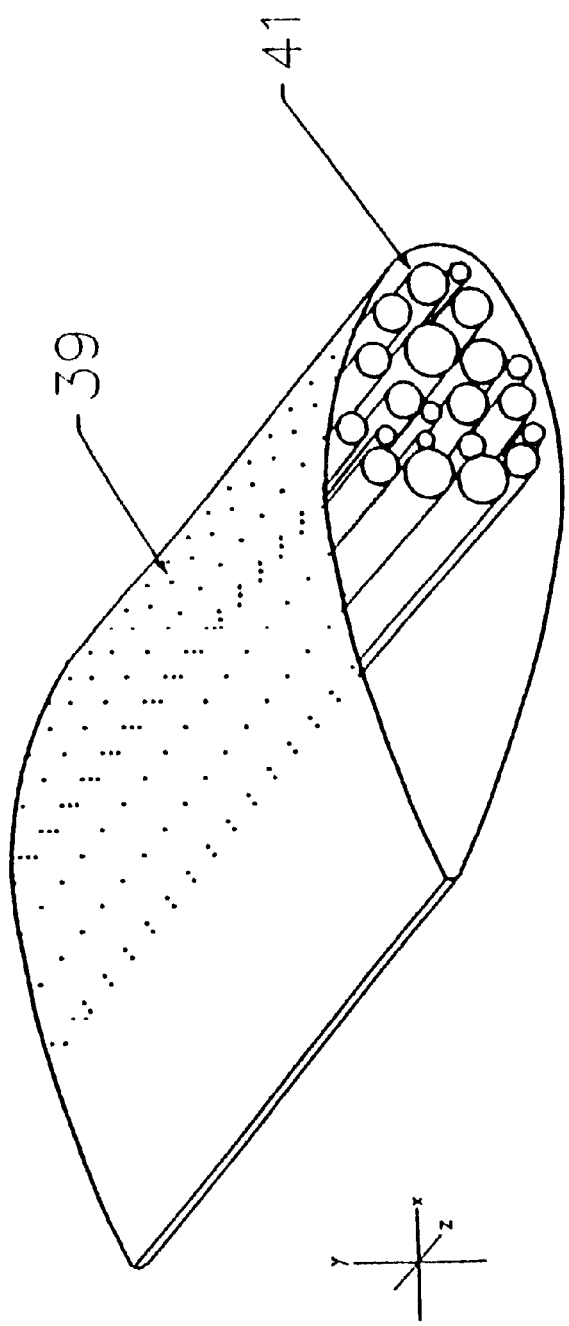
Figure 9:
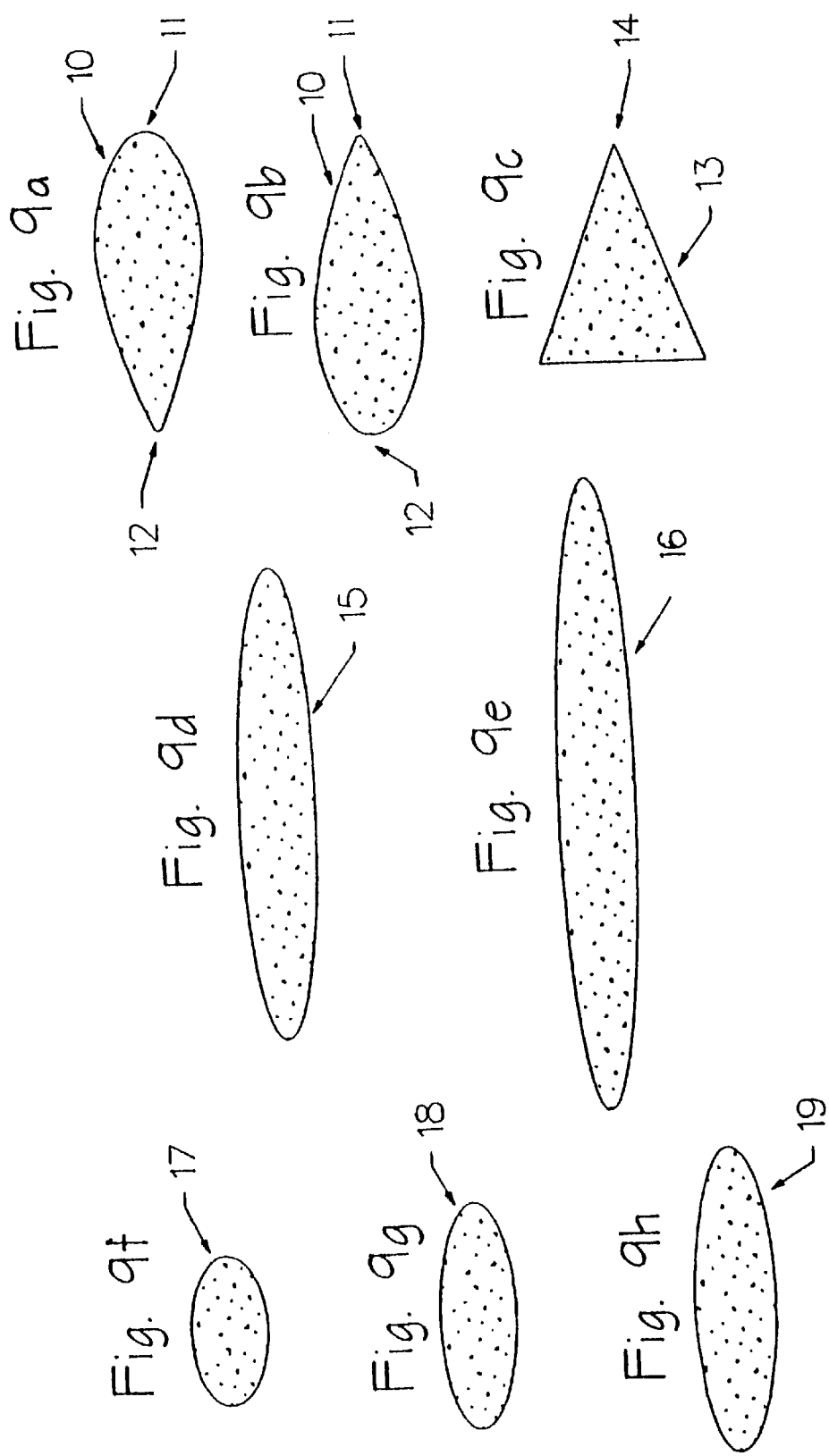
FIGS. 9a–9h illustrate various string shapes like those in FIGS. 3a–3h, respectively, only created with a high strength polymer reinforced with high strength fibers or additives.

FIGS. 7 and 8 illustrate various techniques of manufacturing aerodynamic line having high strength characteristics. With the rise of polymers and other high strength materials, the line can be made to have a longer wear life. As FIG. 7 shows, the line 39 is strengthened with a plurality of reinforcing fiber or plastic ribs 40. In FIG. 8, is the line 39 is strengthened with a plurality of fiber or plastic reinforcing rods 41.

FIGS. 9a–9h correspond, respectively, to FIGS. 3a–3h as far as the configuration of the lines 10, 13, and 15 through 19 illustrated therein are concerned. The only difference between the lines 10, 13, and 15 through 19 illustrated in FIGS. 9a–9h and their counterparts in FIGS. 3a–3h is that the lines in FIGS. 9a–9h comprise high strength (e.g. extruded) polymer reinforced with high strength fibers or additives (similar to the embodiments illustrated in FIGS. 7 and 8).

Figure 10:
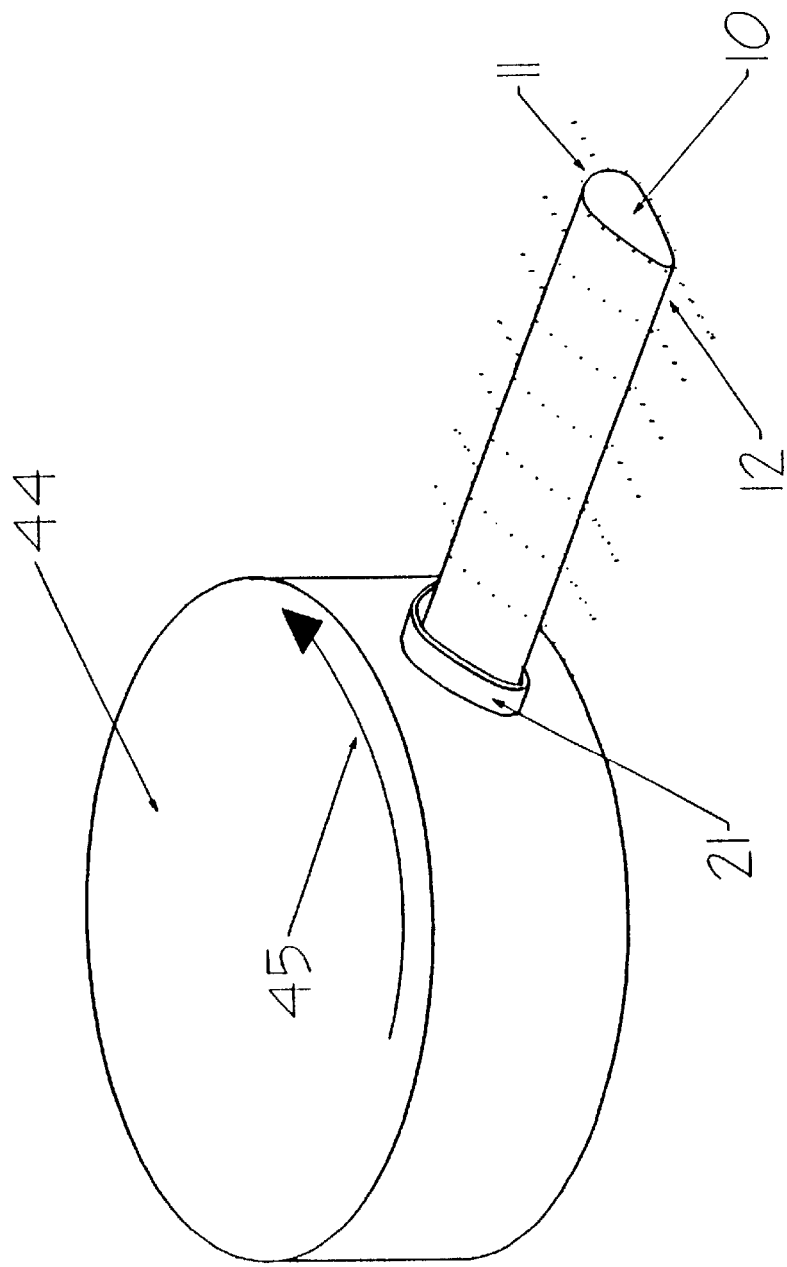
FIG. 10 illustrates the flow of air over an aerodynamic line according to the invention and the lack of pressure differential and associated wake at the trailing edge.
Figure 20:
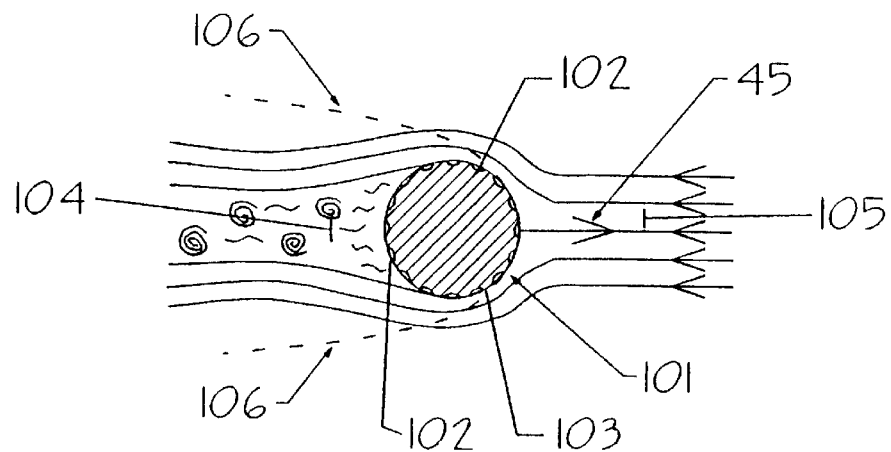
FIG. 20 is a view like that of FIG. 19 for a conventional circular cross-section cutting string but having a dimpled exterior surface while showing the effects on pressure differential and associated wake and erratic flow zone according to the present invention.

FIG. 10 illustrates the flow of air over the aerodynamic string of the invention and the lack of pressure differential and wake disturbance, and also seen in FIG. 20. In FIG. 10 a rotating device 44 is rotating in direction 45 and has a cutting string 10 according to the invention which extends from the eyelet 21 connected to the rotating device 44.

During testing, it has been discovered that different sizes and shapes of string 10 greatly affects fuel or energy consumption of the power source (e.g. gasoline engine or electric motor). Tests were conducted on a Husqvarna 120LC string trimmer. The tests consisted of placing two ounces of gasoline fuel mix in the tank, installing two feet of various string types on the trimmer head, running the motor at 6700 RPM in open air, and measuring the time the fuel was consumed. Each string was measured out 5.5 inches past its head eyelet, e.g. 21, so that the strings had equal cutting diameters. Thus, the test allowed calculation of the approximate engine fuel consumption rate based on each type of string used. The strings used were 0.065 inch round (diameter), 0.080 inch round, 0.080 inch (largest dimension) star, 0.095 inch round, 0.095 inch (side) square, and 0.130 inch round.

Figure 11:
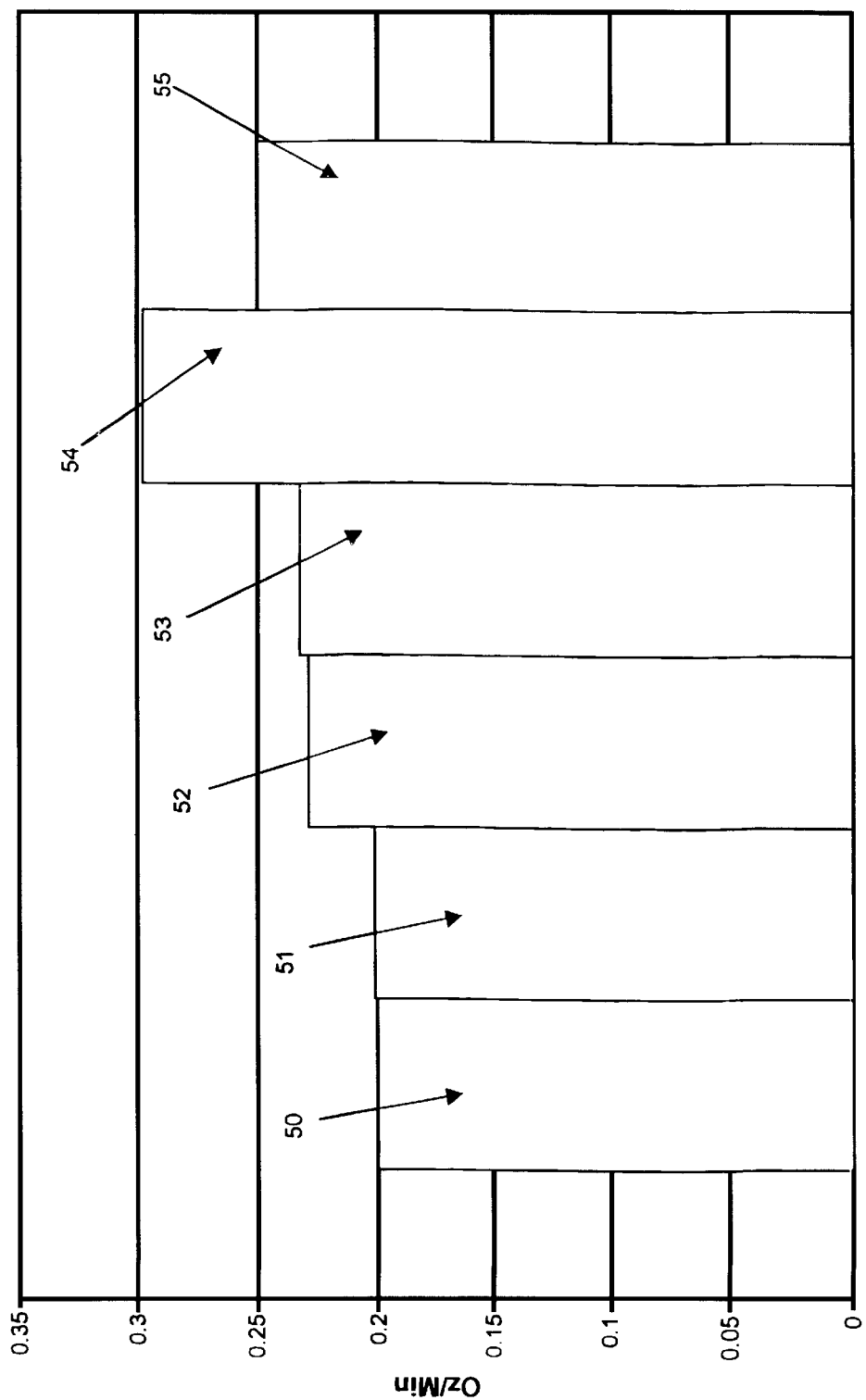
FIGS. 11 to 14 graphically show various comparisons with respect to fuel consumption, speed, and air drag when using different sizes and cross sections of cutting line.

FIG. 11 plots fuel usage in ounces per minute on the Y axis, and a line type and size on the X axis. Graphical representation 50 is for the 0.065 inch diameter round line, graph 51 for the 0.080 round line, graph 52 for the 0.080 star line, graph 53 for the 0.095 round line, graph 54 for the 0.095 square line, and graph 55 for the 0.130 round line. As illustrated in FIG. 11, the 0.095 square line consumed the most fuel, while the 0.065 round line consumed the least. FIG. 11 also shows that more rectangular shaped strings consumed more fuel than their round counterparts.

Figure 12:
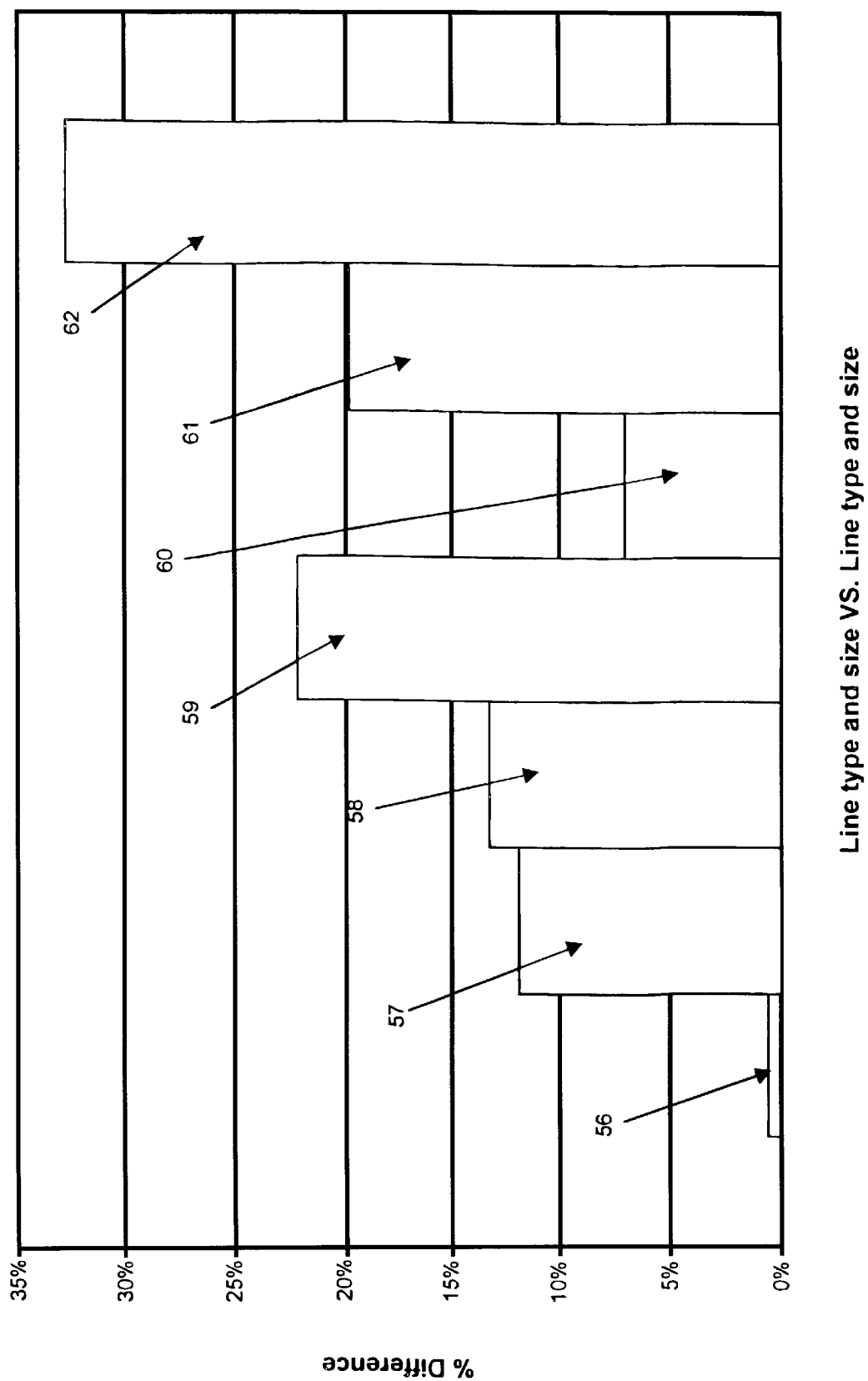

FIG. 12 plots the percentage difference of fuel usage per line type versus the line type and size, for the tests conducted with a Husqvarna 120LC/Shindaiwa Head Line Trimmer. Graph 56 plots the 0.080 inch diameter round line versus a 0.060 round line, graph 57 the 0.080 round line versus the 0.080 star line, graph 58 the 0.095 round line versus the 0.080 round line, graph 59 the 0.095 square line versus the 0.095 round line, graph 60 the 0.130 round line versus the 0.095 round line, graph 61 the 0.130 round line versus the 0.065 round line, and graph 62 the 0.095 square line versus 0.065 round line. FIG. 12 also shows the more rectangular shaped strings consume more fuel than the round counterparts. For example, as shown in FIG. 12, 0.080 star line consumed 13% more fuel than the 0.080 round line, while the 0.095 square line consumed 22% more fuel than the 0.095 round line.

Another test was conducted in order to show the effect of air drag using different types of strings. In this test, each string was installed on the trimmer head and also extended 5.5 inches past its corresponding eyelet (e.g. 21). The motor was then started and brought up to maximum RPM. The maximum RPM was recorded for each string.

Figure 13:
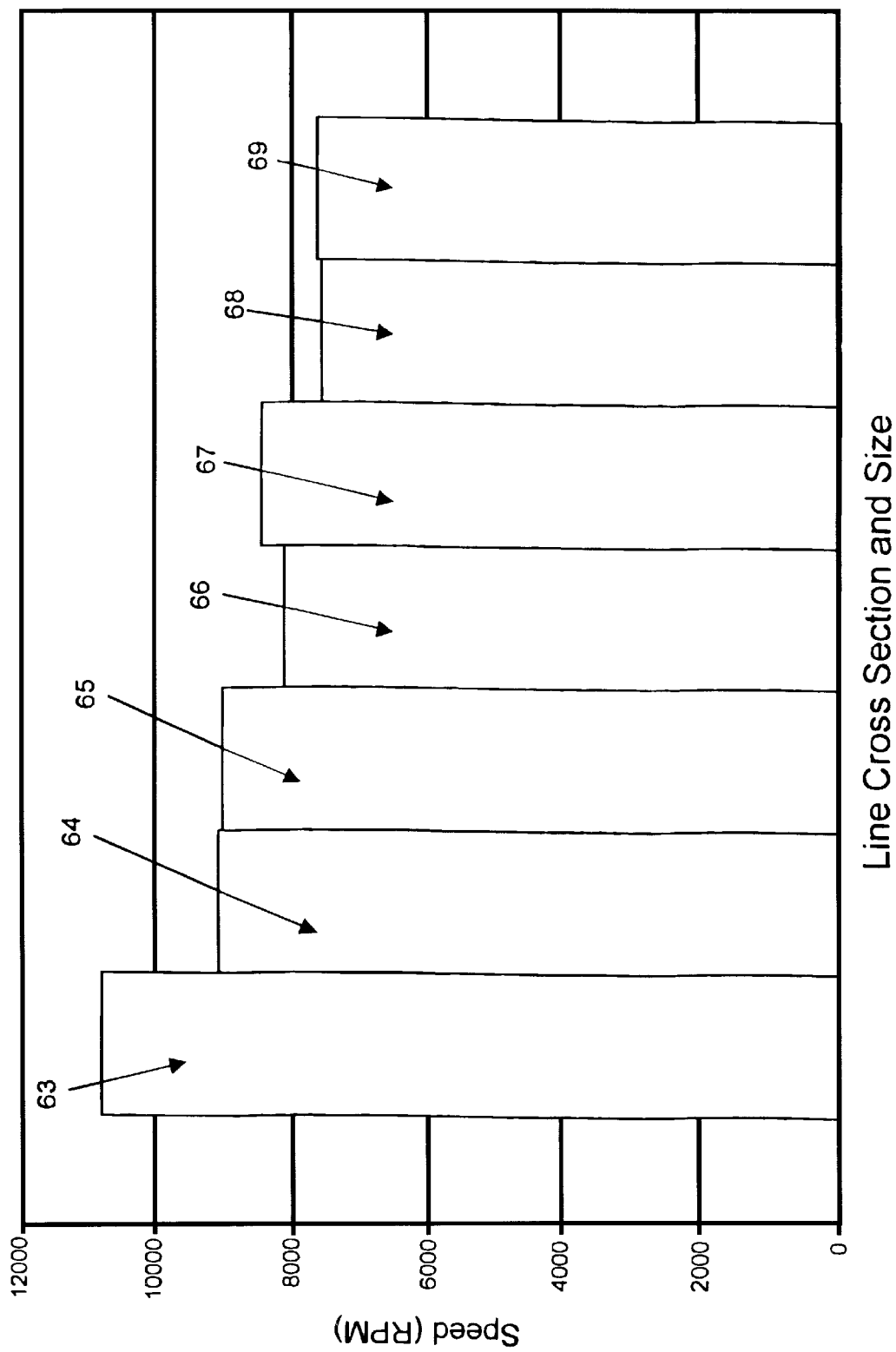

FIG. 13 plots rpm versus a line cross-section and size. Graph 63 is for when there was no line on the head, graph 64 plots a 0.065 inch (diameter) round line, graph 65 a 0.080 round line, graph 66 a 0.080 star line, graph 67 a 0.095 round line, graph 68 a 0.095 square line, and graph 69 a 0.130 round line. FIG. 13 shows that the highest RPM occurred when, of course, there was no string on the head. FIG. 13 also shows that the highest RPM with a string in place was with the 0.065 round line while the lowest RPM was with the 0.095 square line. FIG. 13 establishes that line air drag can considerably slow down engine RPM, all the way from 11000 RPM (graph 63) to 7500 RPM (graph 68).

Figure 14:
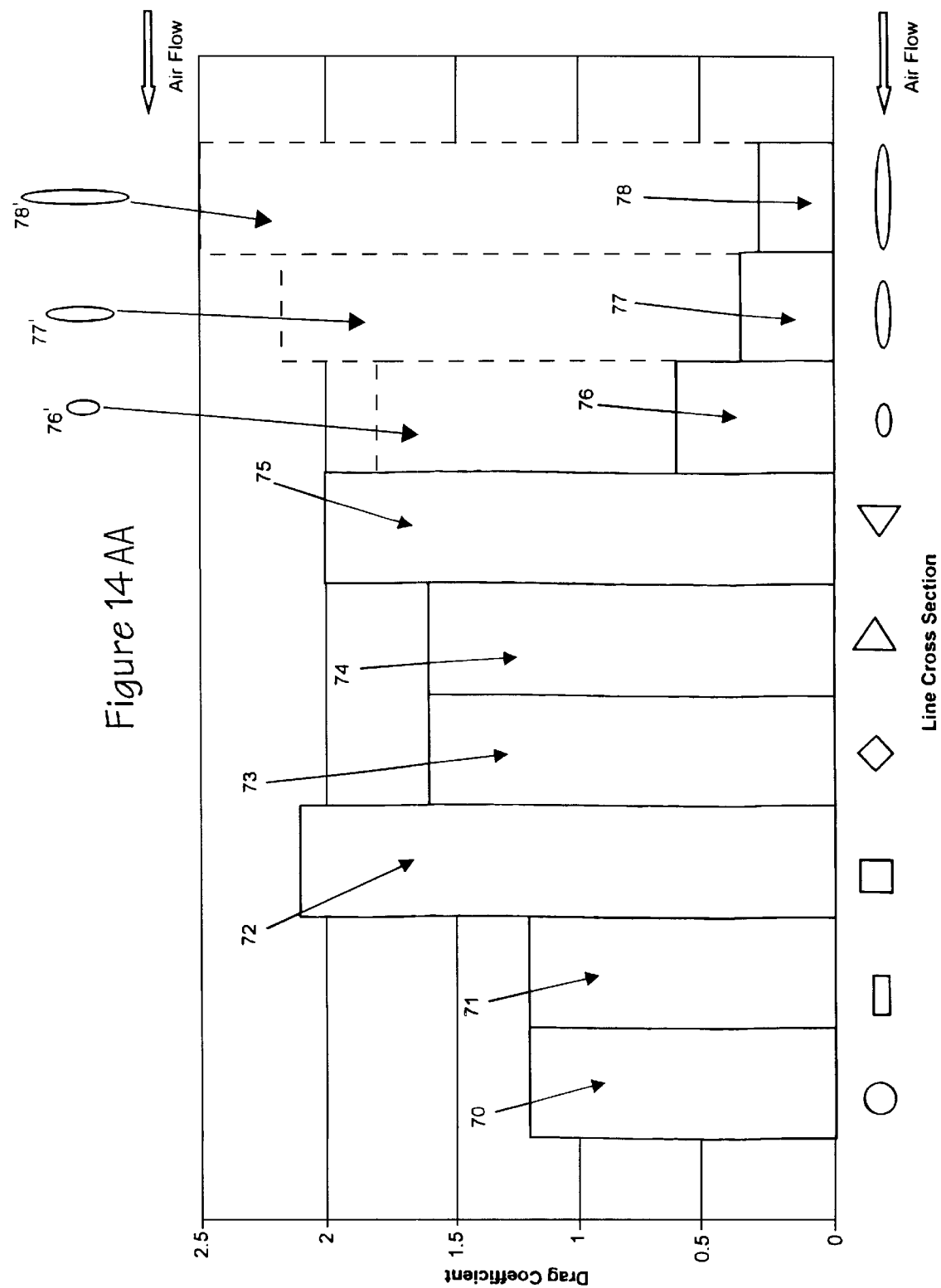

FIG. 14 is a theoretical, or calculated, illustration that provides a comparison between the drag coefficients of different shapes laminar flow. As FIG. 14 illustrates, cutting lines with an elliptical shape have the lowest coefficient of drag of those tested there.

That is FIG. 14 plots drag coefficient versus line cross-section. Underneath each of the graph bars 70–78 the configuration of the particular string cross-section tested is illustrated. For example bar graph 70 is for a completely round cross-section line, graph 71 for a rectangular line, graph 72 a flat face square, graph 73 a corner square, graph 74 a flat face triangle, graph 75 a corner triangle, graph 76 a 2:1 ellipse, graph 77 a 4:1 ellipse, and graph 78 an 8:1 ellipse. The air flow direction also is illustrated in the legend on the X axis of FIG. 14.

Figure 15:
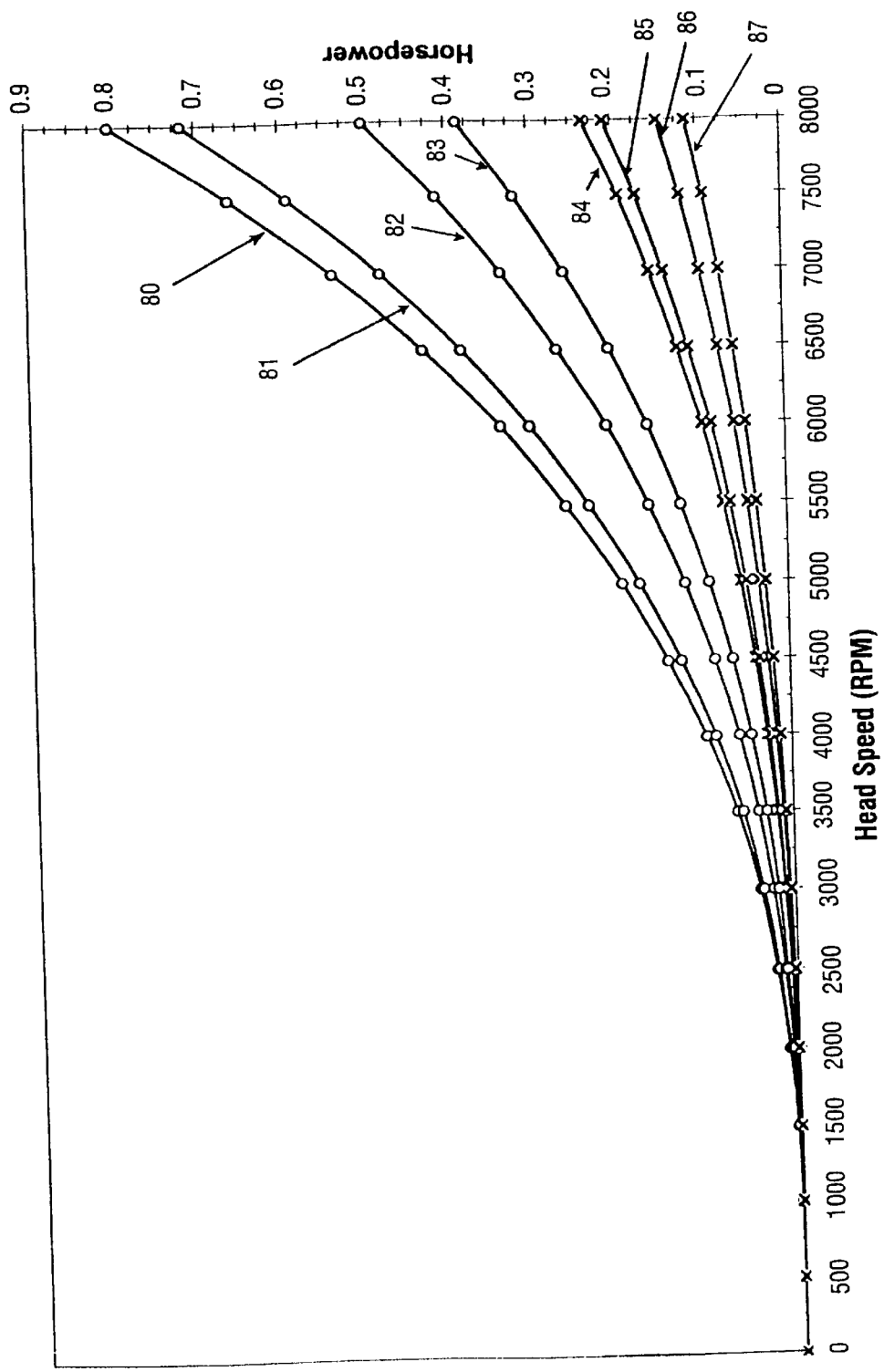
FIG. 15 is a graphical representation of the theoretical or calculated relationship between horsepower and head speed (rpm) for four differently dimensioned round (according to the prior art) and strut (according to the invention) cutting strings, for a single line, 4.5 inch head diameter cutter.

FIG. 15 is a theoretical, or calculated, illustration that shows how the power requirements for rotating a cutting string in a string trimmer differ depending upon the configuration of the cutting string, and its elongated dimension (swath). In FIG. 15 horsepower is plotted on the Y axis and head speed, in rpm, on the X axis, all with a 4.5 inch head diameter. Curves 80 through 83 are for round cross-section, smooth surfaced, conventional, cutting strings each having a 0.080 diameter. Curve 80 plots the data for an 18 inch swath string, curve 81 for a 17.5 inch swath string, curve 82 for a 16 inch swath string, and curve 83 for a 15 inch swath string. Curves 84 through 87, on the other hand, plot the power requirements of a beam-like (strut) cutting string according to the invention, in this case having the tear-drop configuration of the string 10 illustrated in FIG. 3a with a maximum cross-sectional dimension perpendicular to the cutting plane of 0.080 inches (the same as the diameter of the strings used for curves 80–83) and a length, in the dimension of the cutting plane, of 0.296 inches. Curve 84 represents the power requirements at various rpms for an 18 inch swath string according to the invention, curve 85 for a 17.5 inch swath, curve 86 for a 16 inch swath, and curve 87 for a 15 inch swath, again all with a 4.5 inch head diameter.

FIG. 15 clearly illustrates that once the strings are up to any significant speed (e.g. about 3500 rpm) the configuration according to the invention (curves 84–87) has a drag coefficient which is at least 15% less than the drag coefficient of a conventional round, smooth exterior surface, strings indicated by curves 80–83. In fact the drag coefficient of the strut or beam-like cutting strings according to the invention are typically at least 10–300% (e.g. 50–200%) less than for the conventional shape strings. While FIG. 15 does not plot drag coefficient per se the horsepower is proportional to drag coefficient as made clear by the earlier equations. Also FIG. 14, which does plot drag coefficient versus various configurations, illustrates that for the strut shape configurations according to the invention—those are represented by plots 76–78—each have a drag coefficient that is at most 60% of the drag coefficient of the round, smooth surface, cutting string plotted at 70 in FIG. 14. The drag coefficient of a conventional circular string is about 1.2. The drag coefficient of strings according to the invention is 1.0 or less, typically 0.8 or less, and preferably 0.6 or less, and often less than 0.5 (e.g. 0.35 or even less).

Figure 16:
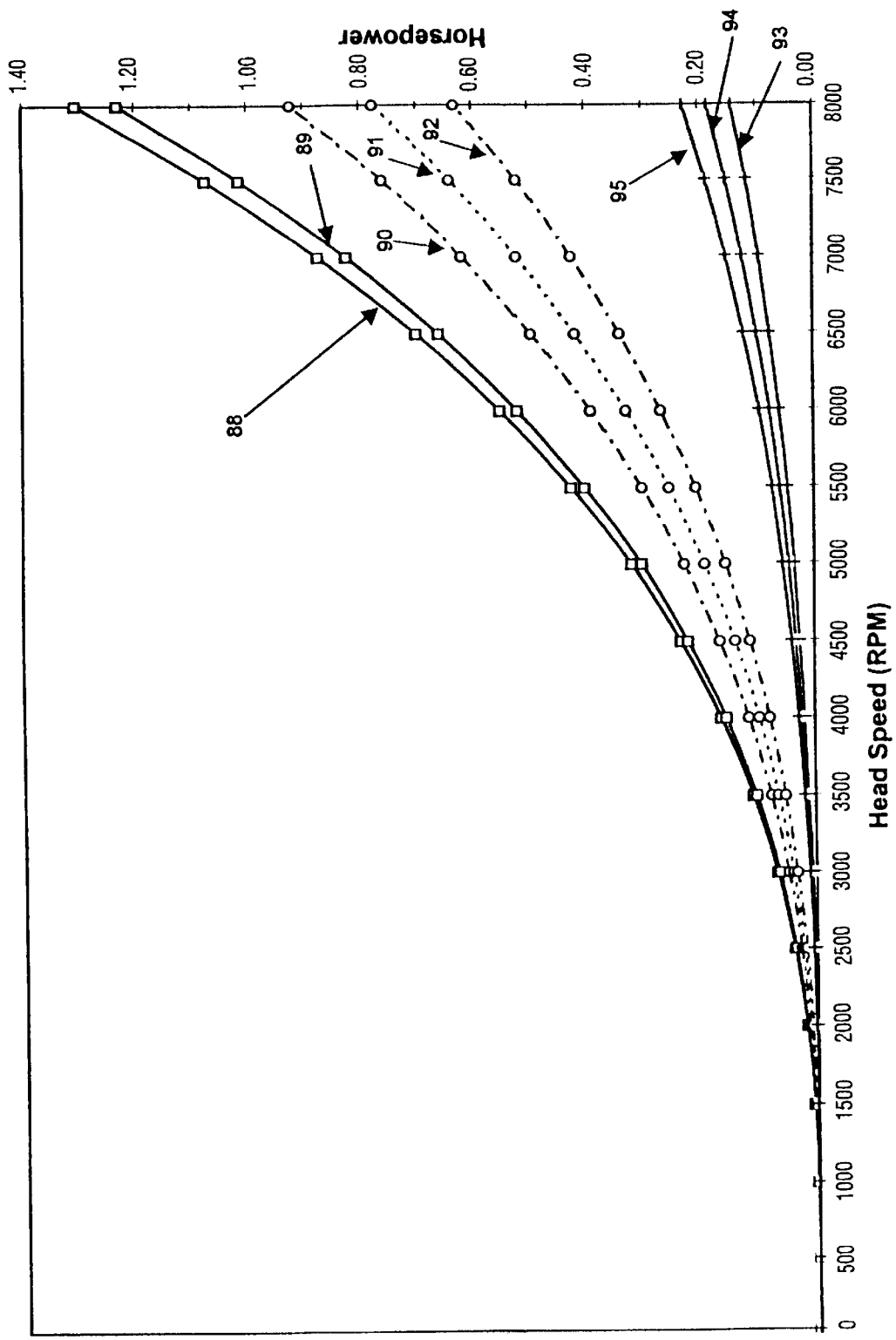
FIG. 16 is a graphical representation of the theoretical or calculated horsepower plotted against head speed (rpm) for a wide variety of different sizes and shapes of the prior art cutting strings compared to strut-like cutting strings according to the invention for a single string having a 17 inch swath diameter and a 4.5 inch spool head.

FIG. 16 is a theoretical or calculated plot similar to that in FIG. 15 only showing a variety of different cross-sectional configurations of strings which cut a constant 17 inch swath diameter, and a 4.5 inch spool head. In FIG. 16, curve 88 plots a 0.095 inch side square cross-section cutting string having a drag coefficient of 2.1, while curve 89 plots an identically dimensioned square cross-section cutting string only having a $C_D$ of 1.6. Graph elements 88 and 89 differ because in graph element 88 the square cross-section was oriented with respect to the direction of cut so that one of the sides of the cross-section was substantially perpendicular to the direction of cut. For graph 89, the string was oriented so that it was turned to look like a "diamond", and it was a diagonal (longest cross-sectional dimension) of the square that was moving in the direction of cut. Curves 90 through 92 plot round cross-section, smooth surface, conventional cutting strings which have the dimensions, respectively, of 0.095 inches diameter (90), 0.080 inches diameter (91) and 0.065 inches diameter (92).

Curves 93–95 in FIG. 16 plot struts according to the present invention. Curve 93 plots a beam-like, generally tear dropped shape, cutting line 10 such as illustrated in FIG. 3a with a maximum cross-sectional dimension perpendicular to the cutting plane of 0.50 inches, with a length in the dimension of the cutting plane of 0.185 inches, while curve 95 plots such a strut with dimensions of 0.80 inches×0.296 inches, and curve 94 such a strut with dimensions of 0.065 inches×0.240 inches. In each case at about 8000 rpm the horsepower used per string is much less than 0.40, typically around 0.20. This is less than a third, and in some cases about a quarter, of the horsepower requirement for round or square cross-sectional strings of approximately the same size.

Figure 17:
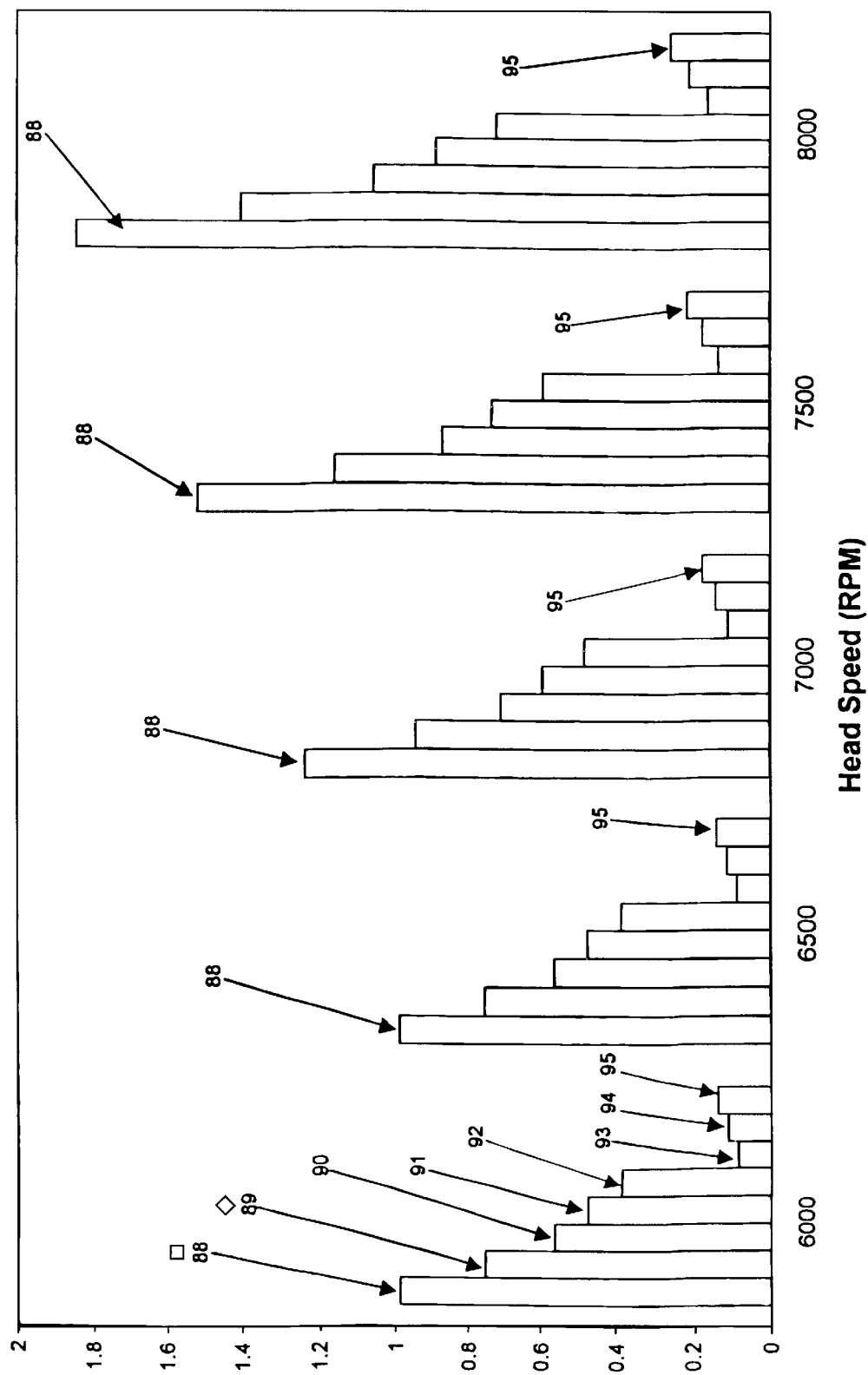
FIG. 17 is a bar graph representation of most of the same data plotted in FIG. 16.

FIG. 17 plots the same data as FIG. 16, only in bar graph form instead of curves, at five different speeds between 6000 and 8000 rpm. The reference numeral designations 88–95 in FIG. 17 correspond to the same designations (for the indicated sizes and configurations of the cutting string) described above with respect to FIG. 16.

Figure 18:
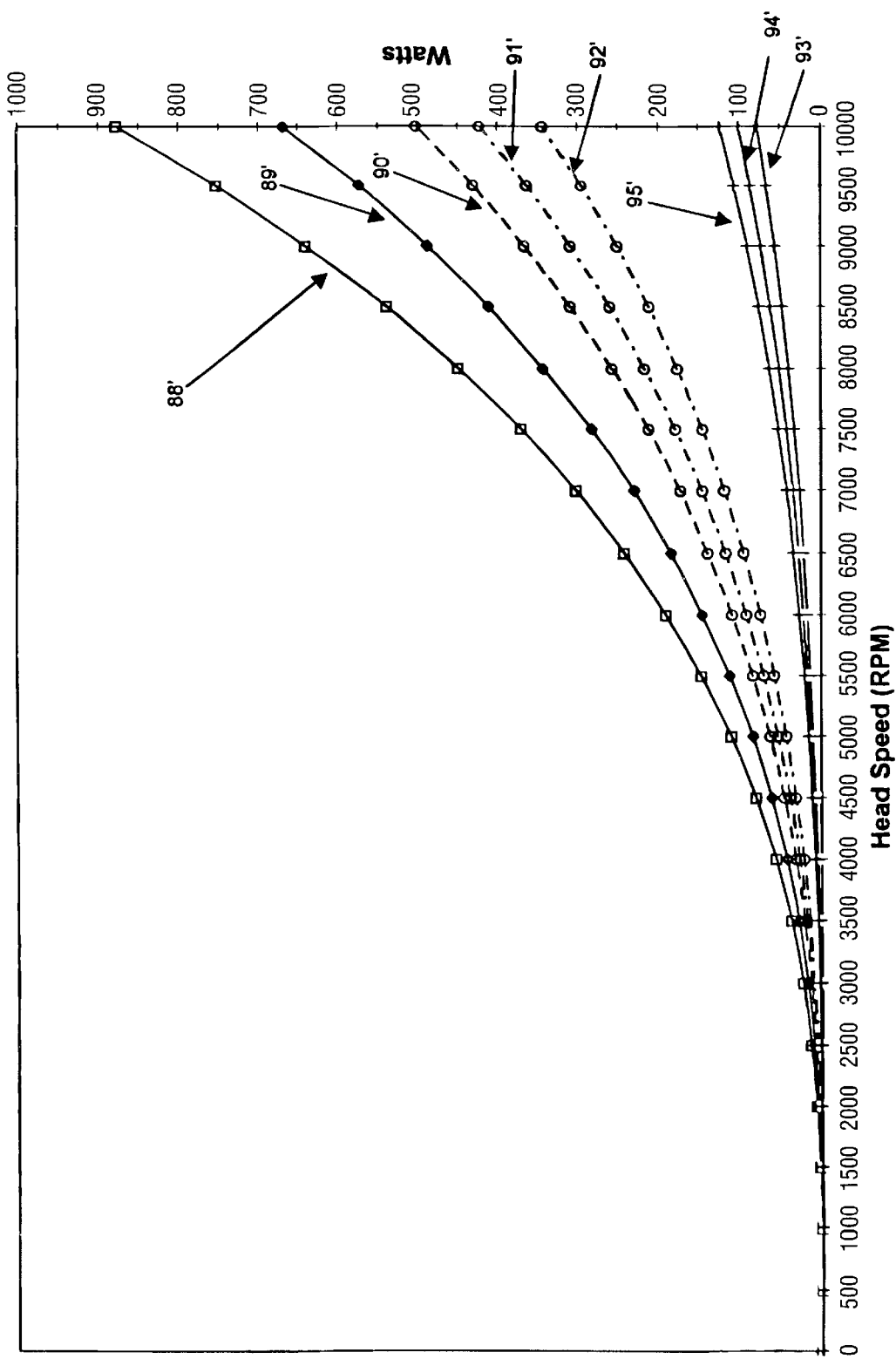
FIG. 18 is a graphical representation showing the theoretical or calculated watts required for a single line cutter plotted against head speed (rpm) for a cutter with a 14 inch cutting swath and a 3.5 inch head diameter, using the same variety of cutting strings as in the graph of FIG. 16.

FIG. 18 is a theoretical or calculated graphical representation like that of FIG. 16 only for a single cutting line with a 14 inch cutting swath and a 3.5 inch diameter of the rotating head. In this embodiment the string configurations corresponding to those in FIG. 16 are shown by the same reference numeral, only followed by a "'". That is the curve 88' plots a 0.095 sided square cross-section cutting line with a CD of 2.1, while curve 93 plots a generally tear drop-shaped strut having dimensions of 0.050×0.185 inches. As can be seen very easily in FIG. 18, the results are very similar to those illustrated in FIG. 16, a single string according to the invention (curves 93'–95') using much less than 200 watts of power at 9000 rpm, and even at 10,000 rpm, and in fact using only about 100 watts at 9000 rpm.

Figure 19:
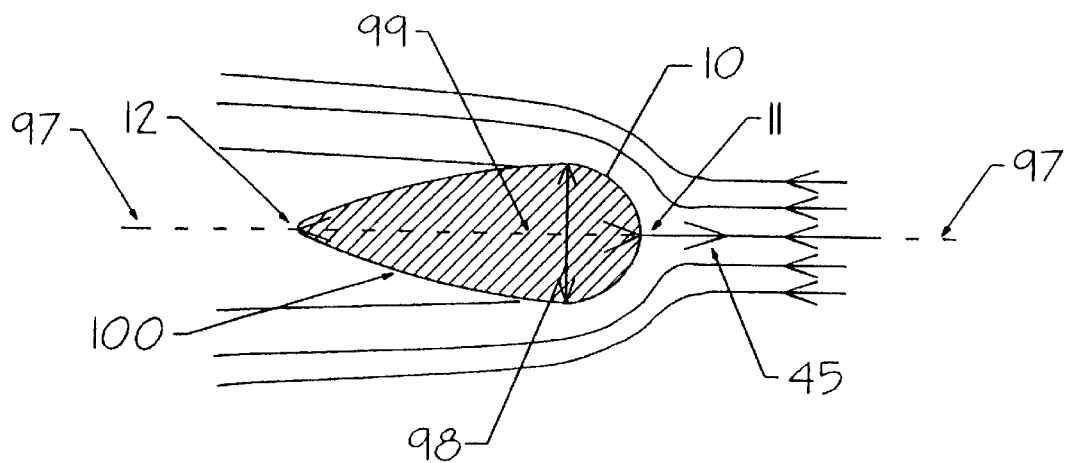
FIG. 19 is a side cross-sectional schematic view illustrating air flow over a strut shaped cutting string with a reduced pressure differential and associated wake according to the present invention.

FIG. 19 is a schematic representation attempting to illustrate the action that air flowing over a beam-like (strut) cutting string 10 (as illustrated in FIG. 3a) experiences. The cutting plane in which the string travels, in the direction of arrow 45 (compare FIG. 10) is illustrated by dotted line 97 in FIG. 19. As is typical for struts 10 according to the invention, the cross-sectional dimension 98 of the strut 10 in the dimension perpendicular to the cutting plane 97 is typically less than 85% (e.g. less than 50%) of the dimension 99 thereof along the cutting plane (between the leading edge 11 and the trailing edge 12). As can be seen in FIG. 19 the air flow follows the shape of the generally tear drop profile, exterior surface 100, of the strut 10, less air being displaced or pushed outward around the periphery than in a circular or square cross-section profile.

FIG. 20 illustrates, very schematically, air flow for a circular cross-section cutting string 101, which should be compared to that illustrated in FIG. 19. In the cutting string 101 in FIG. 20, a plurality of golf ball dimples simulating surface manifestations 102 are provided over the majority of the exterior surface 103 of the cutting string 101. This results in the pressure behind the string 101—that is in the area 104—being somewhat less—compared to the pressure 105 in front of the cutting string 101 in the direction of movement as indicated by arrow 45—then it would be if there were no dimple-simulating surface manifestations 102. The dotted lines 106 illustrate what the erratic flow zone would be in "back" of the string 101 if the golf ball simulating dimples 102 were not provided. Thus while the string 101 is illustrated in FIG. 20 as a much higher CD than the strut 10 of FIG. 19, it is significantly less (e.g. at least 2% less, preferably about 5% less or more) than if no dimples 102 were provided (that is if the string 101 had a conventionally macroscopically smooth exterior surface 103).

FIGS. 21–25 show strut-shaped cutting lines according to the invention which employ textured surfaces, for a further reduction in the coefficient of drag. The strut 110 has a plurality of golf ball simulating dimples 111 formed on the exterior surface 112 thereof, and covering the majority of the exterior surface 112. In fact in the FIGS. 21 and 22 embodiment only the leading and trailing sections 113 and 114 are not covered by the dimples 111, although they also may be covered by such dimples.

Figure 21:
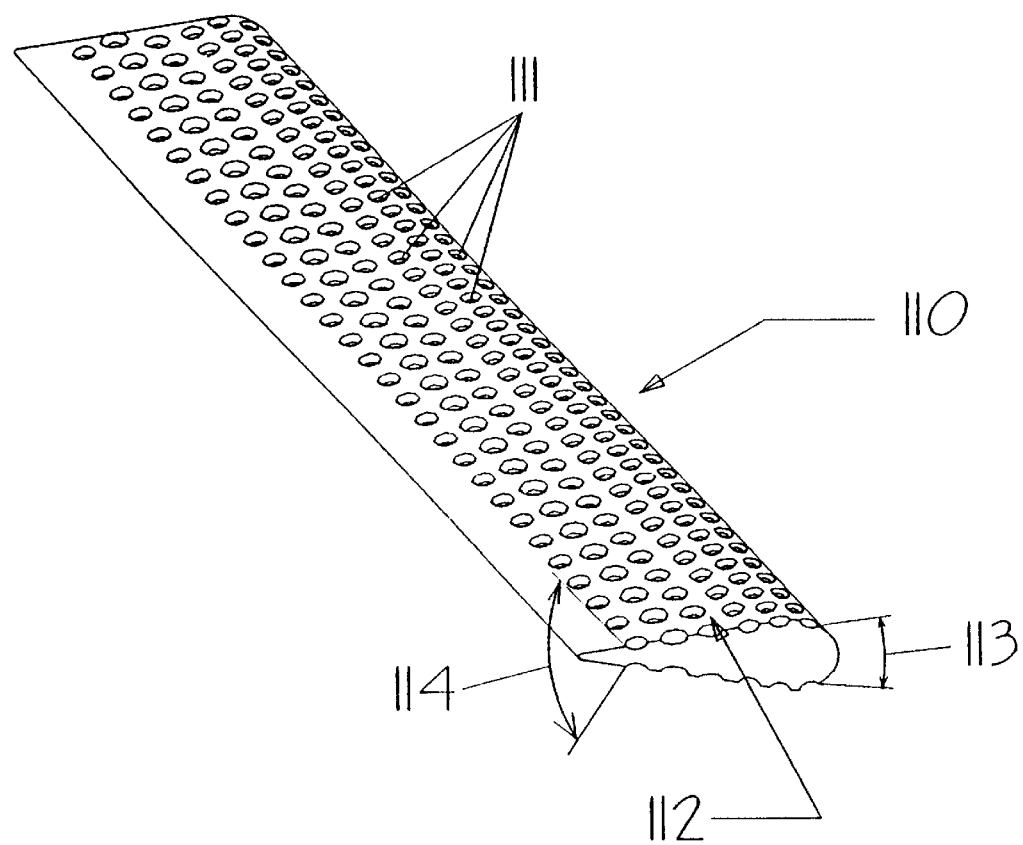
FIG. 21 is a schematic perspective view of a section of an exemplary strut shaped cutting line according to the present invention only having golf ball simulating dimples over the majority of the surface area thereof.
Figure 23:
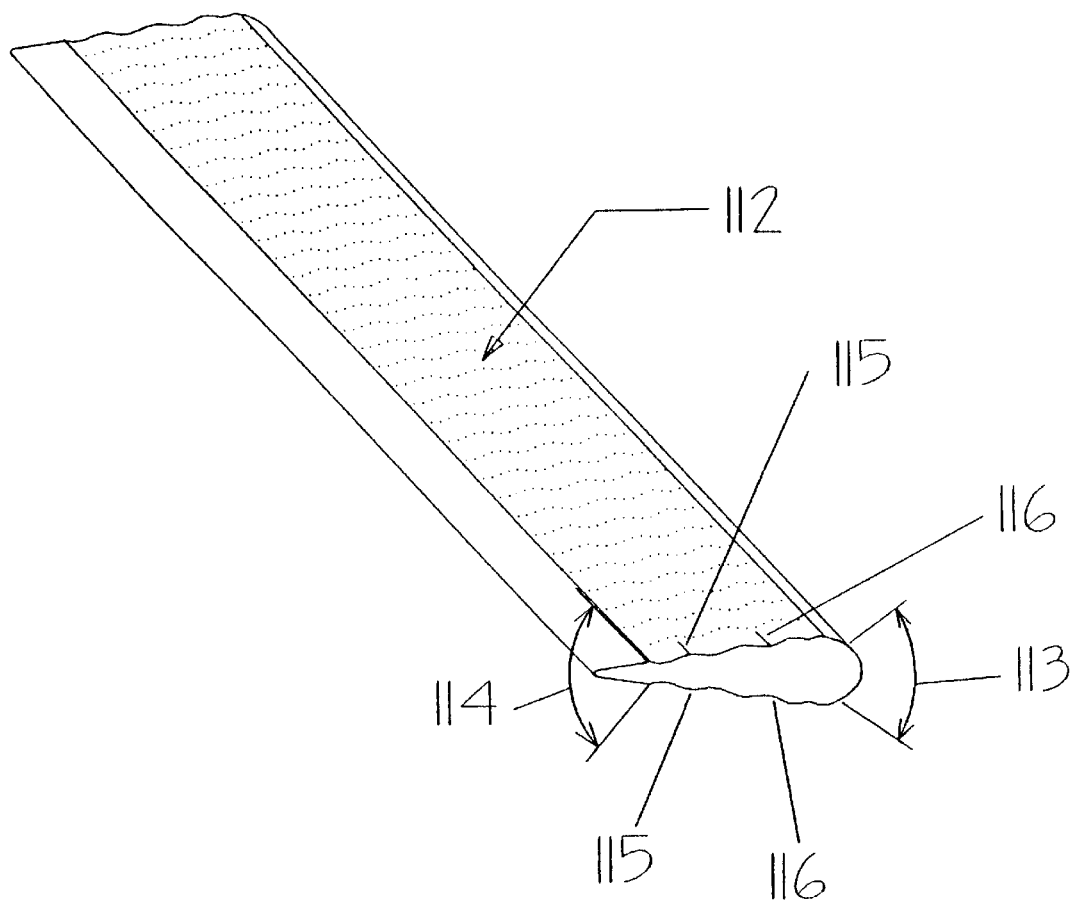
FIG. 23 is a view like that of FIG. 21 only showing the exterior configuration of the strut as having a wavy configuration.

FIG. 23 also shows a textured (macroscopically not smooth) exterior surface of a strut-shaped cutting line according to the invention. In FIG. 23 structures comparable to those in FIG. 21 are shown by the reference numeral. In this case instead of the texturing being provided by the dimples 111 as in FIG. 21, a wavy configuration, as is clear from the peaks 115 and troughs 116 illustrated in FIG. 23, is provided. In this case too the textured configuration (the waves with peaks and troughs 115, 116) are provided over the majority of the exterior surface 112, in fact over substantially the entire exterior surface as set forth above except for the leading and trailing portions 113, 114 (although such texturing may be provided there too).

The line 110 of FIG. 23 may be extruded from polymeric plastic material, and the line 21 may be formed of polymeric plastic material using a variety of techniques including injection molding, or extrusion followed by acting upon the surface 112 while the element 110 is still primarily soft using mechanical means, or fluid jets, to form the dimples 111. The configurations of FIGS. 21 and 22 can be expected to have a drag coefficient at least about 2% (typically at least 5% or at least 10%) less than the drag coefficient of the strut 10 of FIG. 19 which has an exterior surface 100 that is (macroscopically) smooth.

Figure 24:
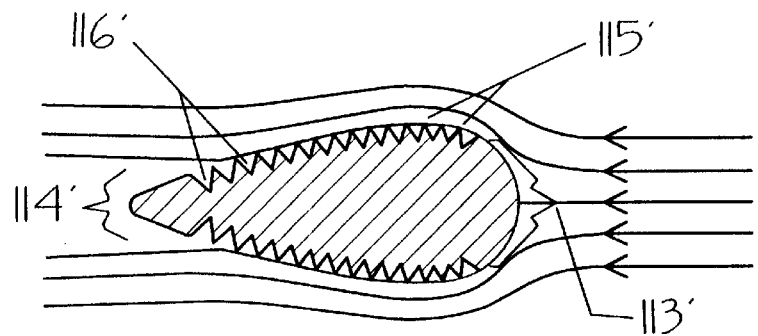
FIGS. 24 and 25 are used like FIG. 22 only showing saw tooth wavy, and pronounced wavy (more pronounced than in FIG. 23) configurations of the exterior surface roughness of an exemplary cutting line according to the invention.
Figure 22:
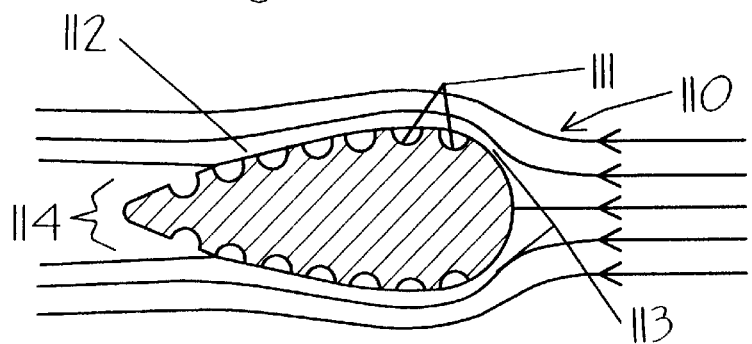
FIG. 22 is a side cross-sectional view of the dimpled tear drop shaped cutting line of FIG. 21, and schematically illustrating the air flow thereover.
Figure 25:
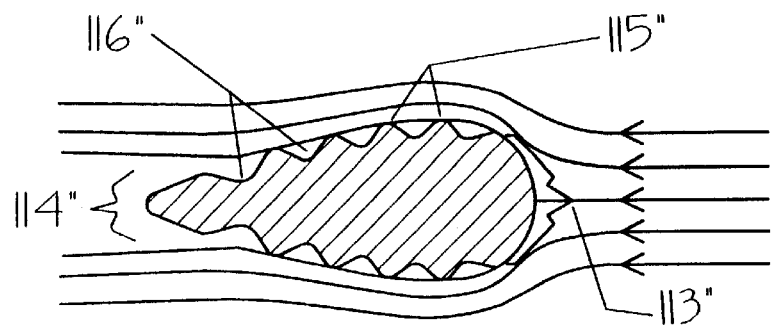

In the embodiments of FIGS. 24 and 25, components similar to those in the FIG. 23 embodiment shown by the same reference numeral only followed by a "'" in FIG. 24, and a "''" in FIG. 25. In FIG. 24 the peaks 115' and the valleys 116' have more a saw tooth configuration, while in FIG. 25 the peaks 115" and the valleys 116" have a slightly more pronounced configuration than in the FIG. 23 embodiment.

In all of FIGS. 19 and 21 through 25 the elongated cutting string 10, 110, has a first axis (the dimension 99, along the cutting plane 97 of FIG. 19) which is the strongest and has the highest moment of inertia, and a second, weaker axis (along dimension 98). In the practice of the method according to the present invention, the cutting string (e.g. 10 in FIG. 19) is rotated about an axis of rotation (as seen in FIG. 10) so that the first axis (dimension 99) of the beam-like cutting string 10 is positively maintained, and moves in the predetermined cutting plane 97, as indicated by arrow 45. That is, the "pitch" of the string 110 is controlled so as to minimize drag and maximize cutting efficiency. The pitch is the angle between the leading and trailing edges (i.e. 11, 12 for line 10) and is maintained at essentially zero according to the invention. By manipulating the handle 6, or other suitable conventional structures associated with the rotating cutting string 10, the rotating cutting string 10 can be brought into contact with vegetation so that the cutting plane 97 is generally transverse to a portion of the vegetation to be cut.

The pitch of the string 110 is positively maintained either by using an eyelet configuration, such as the eyelet 21 earlier described with respect to the FIGS. 4 and 10 embodiment, which has substantially the same cross-sectional configuration as the cutting line 10, 110 itself, and/or by providing a compound taper for the cutting line so that it has increased rigidity and stability closest to the cutting head (e.g. 44 in FIG. 10) and the smallest cross-sectional area at a free end most remote from the cutting head 44 (in FIG. 10). This will be further described with respect to the FIG. 34 configuration, but is also illustrated in FIG. 6. Also, the inherent shape of the aerodynamic string 10, 110 according to the invention results in an air flow as the string is rotated which causes the string to maintain the desired pitch, and other techniques can be used, perhaps such as lines or webs extending from the cutting head to remote points along the cutting string, increased rigidity portions disposed at predetermined spaced points along the length of the string 10, 110, or by other known techniques for enhancing or maintaining orientation. The eyelets 21, compound tapers, and other such mechanisms may be considered means for positively maintaining movement of the strips 10, 110 in the predefined cutting plane 97, for example as illustrated in FIG. 19.

While various elliptical or generally tear-drop shaped cross-sectional configurations of cutting strings according to the present invention are likely the most suitable, a wide variety of alternative shapes may be provided, which also get the improved lower drag coefficient according to the present invention, and the associated advantages of lower power consumption, lower noise level, and the like, that are achieved according to the invention. Some of these configurations are illustrated in FIGS. 26 through 31.

Figure 26:
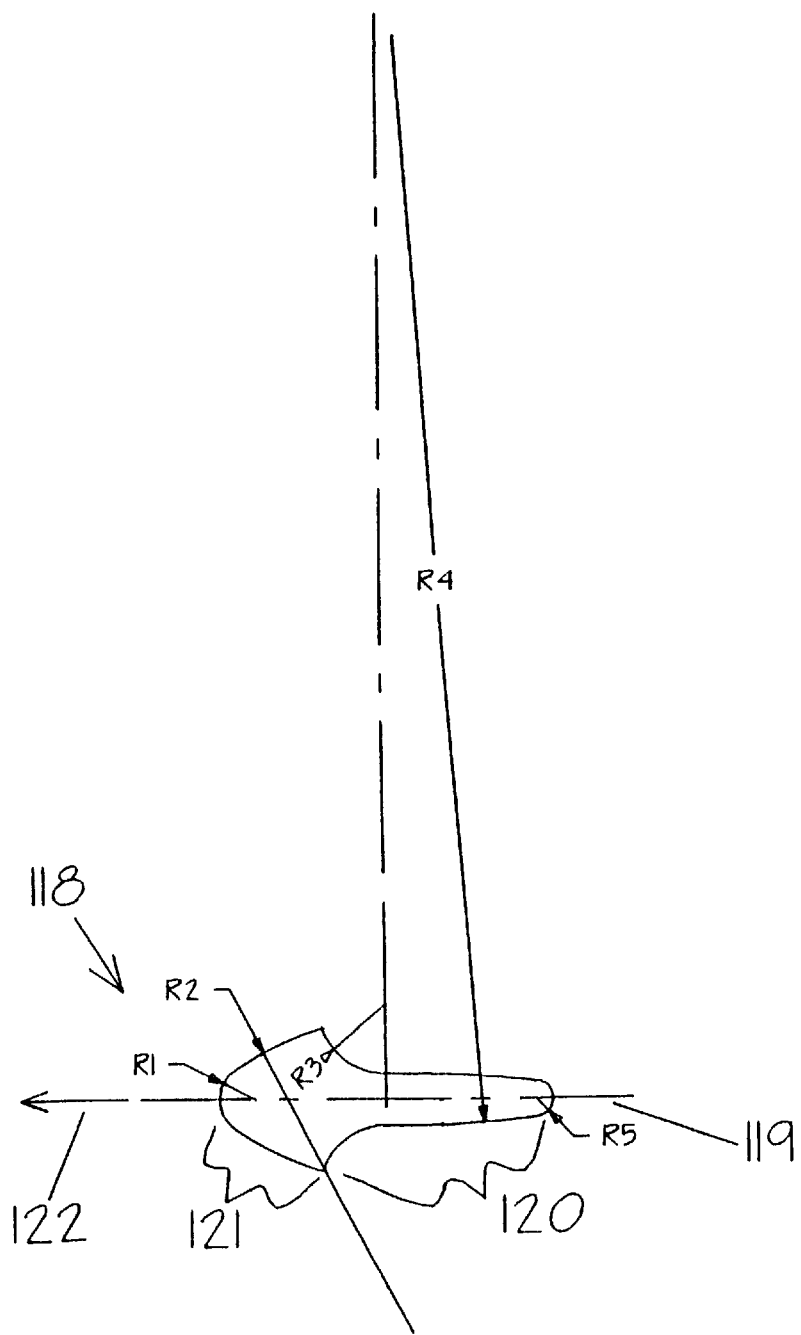
FIG. 26 is a side end view of another exemplary embodiment of a aerodynamic cutting string according to the invention showing a number of different radii and dimensions which can be used to describe the complex area of dynamic shape thereof.

FIG. 26 illustrates a flexible cutting string 118 according to the present invention, viewed along one end. The string 118 is elongated (which cannot be seen because FIG. 26 is an end view), typically having a length of at least a few inches, and is preferably a substantially solid body comprising more than 50% (e.g. more than 90%) polymeric or other non-metallic flexible/resilient material (although some interior openings or hollow channels may be provided). The configuration illustrated in FIG. 26 and shown generally by reference numeral 118 may be said to simulate an ice cream cone. That is it has a small cross-sectional dimension perpendicular to that of the cutting plane 119, substantially cone-shaped portion 120, primarily indicated by dimension X5 but also possibly including dimension X2, which merges into a larger cross-sectional dimension (perpendicular to the cutting plane 119) portion 121 which is substantially parabola shaped. As seen in FIG. 26, a variety of different x and y dimensions are provided, as well as five differently radiused portions R1, R2, R3, R4 and R5. In fact the cutting string 118 is very similar to the generally tear drop-shaped cutting string 10 of FIG. 19 except for more complex curvatures and other exterior surface configurations downstream of the portion 121 in the direction of movement, as indicated by arrow 122. The string 118 can be expected to have a drag coefficient similar to those of the struts in FIGS. 19, 21, and 23.

Figure 27:
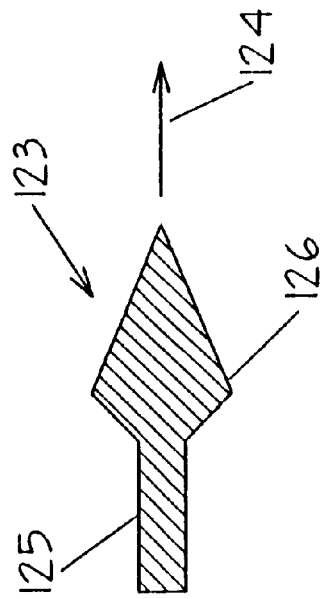
FIGS. 27 through 31 are views like that of FIG. 26 only for other embodiments of cutting strings according to the invention.

FIG. 27 illustrates a cutting line 123 according to the present invention which simulates a spearhead in cross-sectional configuration. That is the cutting string 123 has a small cross-sectional area (transverse to the cutting plane in which it is positively maintained, and direction of the movement is indicated by arrow 124 in FIG. 27) rectangle 125 which merges into a larger cross-sectional area (again transverse to the direction 124) portion 126 which has a trapezoid configuration (and possibly, although far less desirably, a parallelogram configuration).

Figure 28:
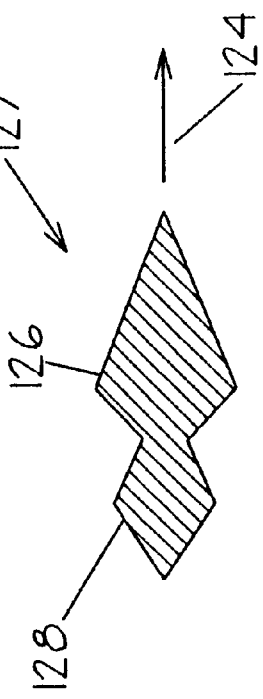

FIG. 28 shows a cutting string 127 according to the invention which simulates a keyway, having a small cross-sectional area trapezoid 128 merging into a larger cross-sectional area trapezoid 126 preferably of substantially the same shape as the trapezoid 128.

Figure 29:
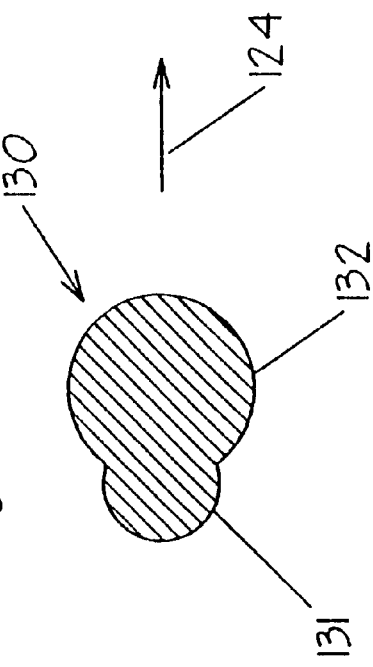

FIG. 29 illustrates schematically a cutting line 130 according to the invention, typically designed to move in the direction 124 (and guided by a corresponding eyelet in that direction, as indicated by the eyelet 21 in the FIG. 10 embodiment) which also simulates a keyway (although a different type of keyway than in FIG. 28). In this embodiment a small diameter circle 131 merges into a large diameter circle 132, the center of each (as is also true in the FIGS. 28 and 29 embodiment for the various portions thereof) being substantially concentric in the direction of movement 124 (which also is the cutting plane) during typical use of the string 130.

Figure 30:
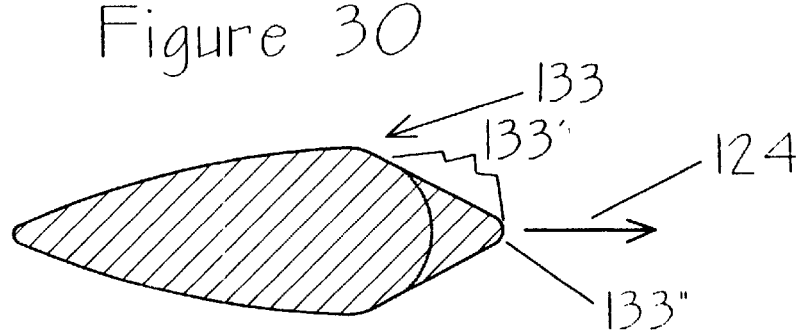
Figure 31:
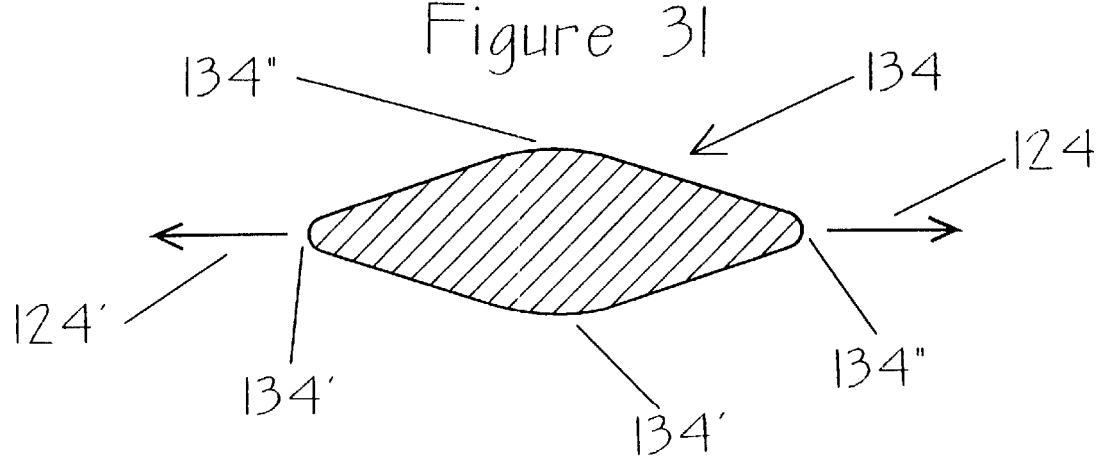

FIG. 30 shows a cutting line 133 according to the invention which has tear drop configuration substantially identical to the line 10, except that there is an extension nose portion 133' thereof that has a rounded apex 133". The cutting line 134 of FIG. 31, which is reversible (that is may equally well be moved in the directions 124, 124') has a configuration/cross section that is substantially like a diamond only with rounded apices 134', 134". Both the strings 133, 134 can be expected to have a CD of about 0.4 or less, or may be extruded or injection molded non-metallic or substantially a non-metallic material.

Almost any reasonable number of cutting strings may be utilized with a rotating cutting head in string trimmer and like vegetation cutters according to the present invention. For example instead of just one cutting string a cutting head may have two, three, four, or more, cutting strings associated with it. This is schematically illustrated, for one particular embodiment (although all sorts of spool, or other configurations, may also be provided) according to the present invention in FIGS. 32 and 33.

Figure 32:
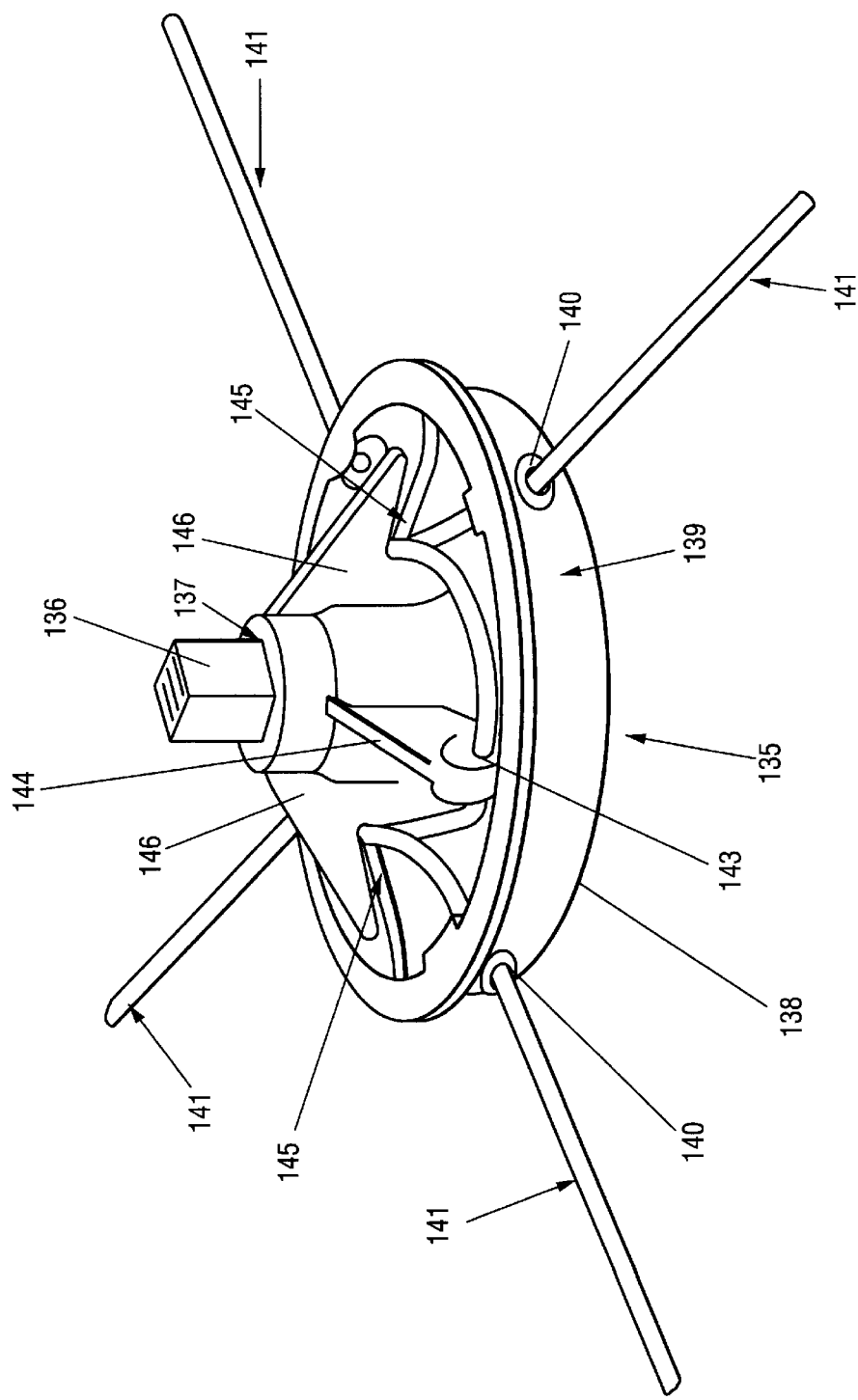
FIG. 32 is a perspective schematic view of a cutting head according to the present invention with four cutting strings extending therefrom.
Figure 33:
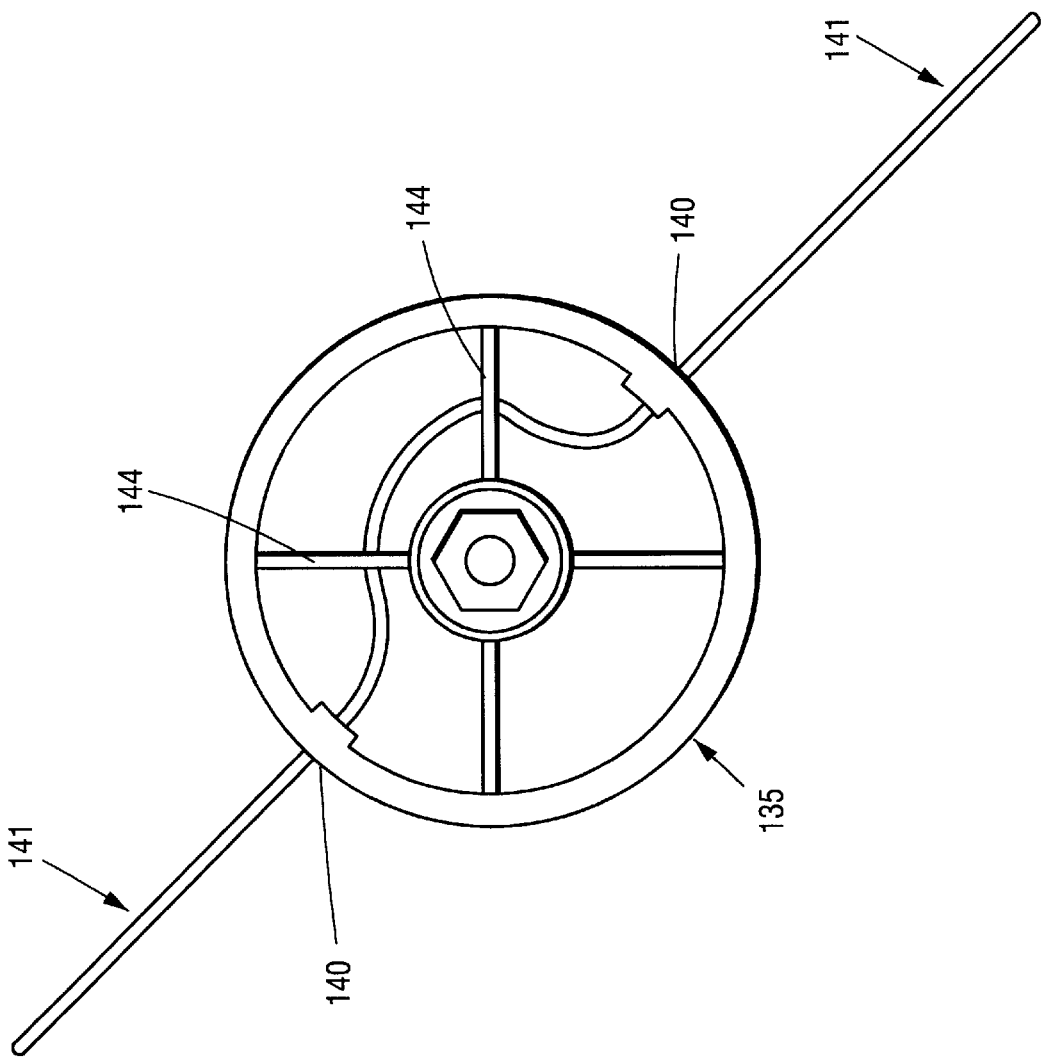
FIG. 33 is a top plan schematic view of a structure like that of FIG. 32 only with one cutting string instead of two.

FIG. 32 shows a more or less open top bowl-shaped rotatable head 135, which is connected to a shaft 136. The shaft 136 is rotated by a conventional power source, such as the source 5 schematically illustrated in FIG. 1, as indicated by the arrow 137 in FIG. 32. The substantially bowl-shaped head 135 has, in this preferred embodiment, a substantially smooth and continuous and slightly substantially closed rounded bottom 138, with a sloped, but generally vertical and continuous, side wall 139. The side wall 139 has a plurality of eyelets 140 formed or inserted therein, the eyelets 140 having the same basic configuration as the cutting strings 141 which extend therethrough. In the embodiment illustrated in FIG. 32 the cutting strings 141 having a substantially tear-shaped or aerodynamic configuration as seen with respect to FIGS. 19, 21, 23, and 30.

In the embodiment of FIG. 32, two cutting elements are provided each having two cutting strings 141. As perhaps best seen in FIG. 33 where only one precut line, which forms two of the string elements 141, is illustrated, a cut length primarily polymeric material line passes from each eyelet 140 through an opening 143 (see FIG. 32) in a radially extending interior arm 144, into an open top slot 145 formed in another radially extending element 146, which frictionally holds the line in proper place. A second cut length element 25 is provided for extending through the other eyelets 140. When the strings 141 wear out, the head 135 is simply removed (such as by using a conventional readily disconnectable and reconnectable feature to the shaft 136) and replaced with another head 135, and/or the removed head 135 with the worn cutting strings 141 is simply acted upon to—even by hand—remove the old cutting strings 141 and insert new lines in their place by threading through the eyelets 140, openings 143, and slots 145.

Figure 34:
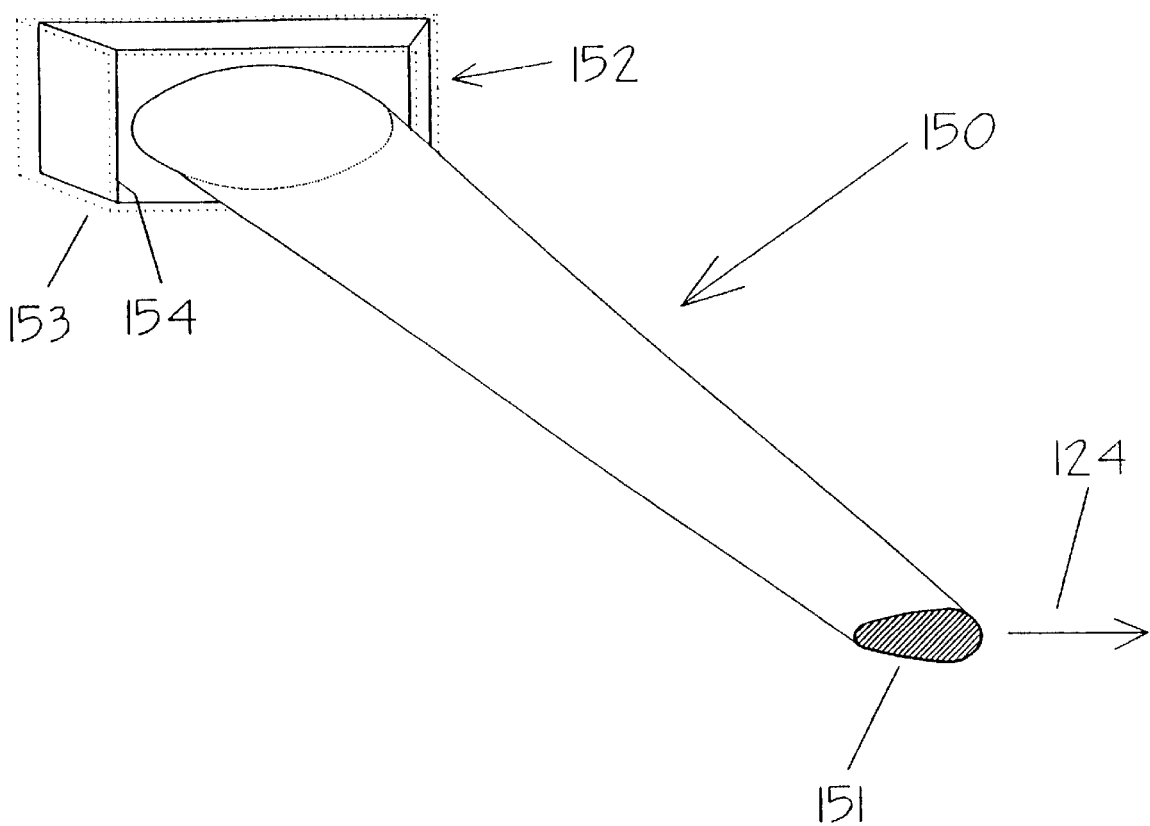
FIG. 34 is a top perspective schematic view, partly in section, of a compound taper exemplary cutting line according to the present invention, which configuration insures that the cutting line moves in the proper orientation (with a proper pitch) during cutting.

An exemplary compound taper cutting string according to the present invention, which either with or without a cooperating eyelet shape, positively maintains the appropriate string pitch during cutting, is shown in more detail in FIG. 34. The cutting string shown generally by reference numeral 150 has a free end 151 which has a relatively small cross-sectional area, and a connection end shown generally by reference numeral 152 which has a larger cross-sectional area (typically about 50% larger, and more desirably at least 2 3 times as large, as that of the free end 151). The end 152 is at or immediately adjacent the rotating head of the trimmer, indicated generally by reference numeral 153 in FIG. 34, and may be mounted in an eyelet, shown in dotted line at 154 in FIG. 34. While the string 150 may have the same cross-sectional configuration (although increasing in diameter, either in increments, or—as illustrated in FIG. 34—substantially continuously), such as the generally tear-drop configuration illustrated in FIG. 34, the cross-sectional configuration can change. For example, as illustrated in FIG. 34 while the free end 151 is generally tear-drop shaped, so that the string 150 has a small $C_D$, and so that aerodynamic shape is continued over substantially the entire length of the string 150 exterior of the head 153, the end 152 has a different cross-sectional configuration, in the exemplary embodiment illustrated in FIG. 34 a rectangular configuration. A rectangular configuration, such as for the end 152 illustrated in FIG. 34, is easier to positively hold in an eyelet 154, if utilized, to insure positive maintenance of the pitch of the string 150 as it is moving in cutting plane in the direction 124.

Figure 35:
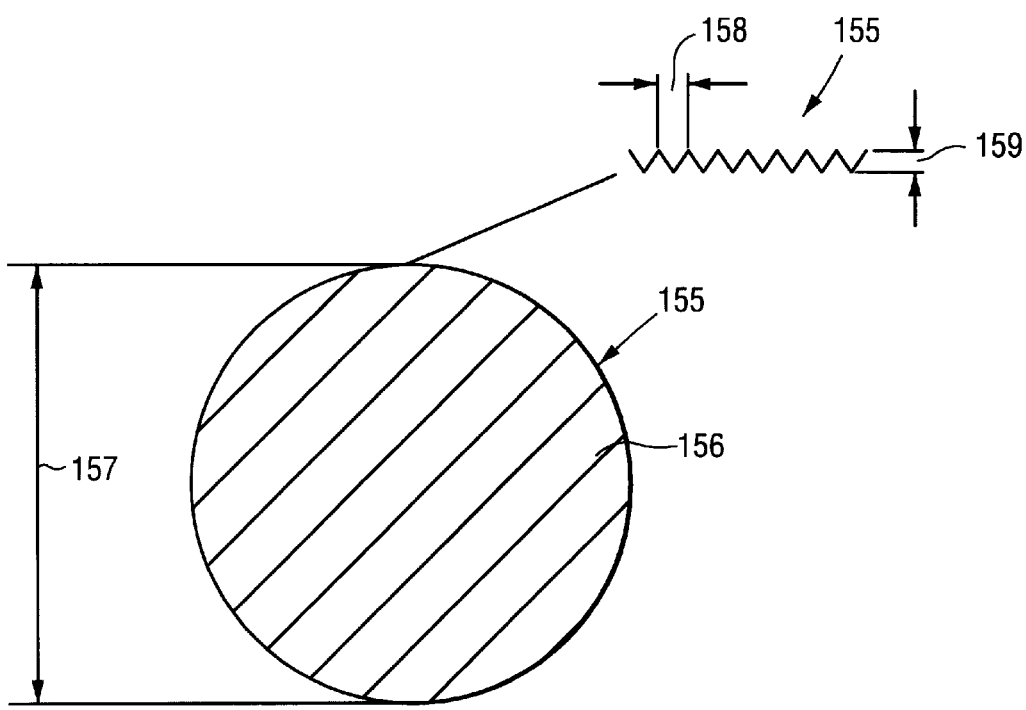
FIG. 35 is a cross-sectional greatly enlarged view of a textured circular cross-section cutting line according to the invention.

FIG. 35 is an enlarged view of a flexible primarily or substantially polymeric string 156 like that of FIG. 20 only having a saw tooth texture on the exterior surface 155 thereof. The string 156 has a diameter 157, e.g. about 0.08 inches, and the spacing 158 between "teeth" may be about 40–100 microns (or more), e. g. about 50 microns. The depth 159 also can be about 40–100 microns (or more), e. g. about 50 microns. The textured configurations of FIGS. 20 and 35 are expected to give a reduction in drag of at least about 2% (typically at least 3%, e. g. about 5% or even more) compared to otherwise identical lines without drag-reducing surface texturing.

Actual tests, including those described above, and calculations establish that the use of an aerodynamic flexible string or cutting element (e.g. a substantially self-supporting strut) in accordance with the present invention provides the following advantages:

(1) Fuel and Energy Savings—Can potentially be very large due to overall usage of flexible line trimmers, both in the private and commercial sectors. Smaller horsepower engines, lower speed of line, etc. will result, thus further realizing the energy savings benefit.
(2) Increased Durability—Increased cutting plane length of aerodynamic cutting line decreases stress on line, as well as, increases length of line to wear in the cutting plane.
(3) Higher cutting efficiency at lower speeds.
(4) OEM Cost Reduction—Lower cost models with comparable cutting efficiency will be achievable by OEM's, as well as competitive advantage in the marketplace.
(5) Lower Emissions—Lower fuel usage in the consumer and commercial sectors will reduce overall emissions to the atmosphere caused by gasoline/oil mix used for combustion to drive the string trimmers.
(6) Decreased Noise—A reduction of aerodynamic noise (less whirl) and reduced engine speed will provide noise reduction due to the invention's better ability to cut at lower speeds will combine to benefit both users of flexible line trimmers and nearby bystanders, and support compliance with stricter noise ordinance limits in more densely populated areas.
(7) A means to replace the need for the complex bump advance mechanisms as the invention offers better life and durability as well as simple change and replacement.

In addition according to the invention battery units are more feasible, and of course battery units have no emissions, are lightweight, have no complex engine to start, no flammables such as gasoline or oil to mix or refill, and will encourage the development of appropriate battery technology. Also, according to the invention smaller two cycle engines or more efficient four cycle engines may be used which will reduce emissions and provide lighter weight power heads. Also, aerodynamic efficiency in general is improved by the shapes, reduced coefficient of drag (by reduction of pressure drag and the reduction of skin friction) and with a horsepower necessary to effect cutting movement. Also, the cutting lines according to the invention are stronger since the long axis of the profile leads into the plane of the cut, with increased moment of inertia, and therefore reduced stress on the line. Also, the centrifugal force is increased due to a higher mass, which in turn increases the stiffness of the beam. Also, according to the invention strengthening additives such as internal filaments or fibers or abrasive resistance additives may be included in the string material, and in general this results in better overall performance for cutting vegetation. Also, because of the string configuration it contains a higher volume of cutting material which extends the abrasion time by the amount of extra material and thus provides a longer life (typically a tear drop configuration has about 2.5 times more material than a comparable circular configuration line). Also, a compound taper configuration increases strength of the line at the head junction, which can be advantageous to reduce stress at a most vulnerable stress point. The invention can be used with one or multiple lines, and with conventional bump-advance mechanisms which let out a predetermined length line, or with precut controlled length lines that do not use the bump advance mechanism.

Also one can actually see the swath plane of the tip of the tear drop (and other) configuration, making it easier for the operator to more effectively control the trimmer in feeding the invention into the grass thus preventing the stresses created by overfeeding.

In accordance with the present invention described above, a cutting string is provided which greatly reduces the effects of aerodynamic drag associated with the moving strings. Reducing the effects of aerodynamic drag leads to a number of important benefits. These benefits include reduced wear and tear on, for example, the eyelet through which the string is dispensed and the bearings around which the head rotates. Moreover, the aerodynamic cutting strings according to the invention provide a superior design for cutting grass, weeds, and other vegetation. The line has particular application in cutting along fences and around trees, shrubs, and edges of buildings and to help manicure the lawn. Further, it can be used to cut weeds in uncultivated areas, and for edging along sidewalks, driveways, planters, or the like.

The aerodynamic strings of the invention may be used with a wide variety of grass and weed cutting apparatus. While the well-known operator-supported flexible line trimmer is one readily apparent application for strings according to the invention, the string technology may also be used with out-board trimmer devices attached to lawn mowers or directly in place of mower blades of walk behind power mowers.

Moreover, in recent years, more powerful trimmer devices on wheels have been introduced to the market place. Such devices generally resemble a conventional walk-behind lawn mower but rather than a metal cutting blade, a string cutting line is employed. While wheeled cutting trimmers offer certain advantages over hand-held trimmers, wheeled trimmers continue to use prior art cutting strings with all of their inherent deficiencies as discussed above. Accordingly, the aerodynamic strings of the invention can be used to provide walk-behind/ground supported (e.g. wheeled) trimmers with the same benefits as described above with respect to manual trimmers.

Many variations and modifications of the above described embodiments of the present invention will become apparent to those of ordinary skill in the art from a reading of this disclosure. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of cutting vegetation using at least one elongated flexible string having a first axis which is the strongest axis and has the highest moment of inertia, and a second, weaker, axis, and having during use a drag coefficient of 1.0 or less said method comprising the steps of:

(a) rotating the elongated string about an axis of rotation so that the first axis thereof is positively maintained and moves in a predefined cutting plane and so that the drag coefficient of the string is 1.0 or less; and (b) bringing the rotating string into contact with vegetation so that the cutting plane is generally transverse to a portion of the vegetation to be cut, and the string cuts the vegetation.

2. A method as recited in claim 1 wherein the string has an exterior surface with aerodynamic surface texturing; and wherein step (a) is practiced to rotate the string so that the drag coefficient thereof is at least 2% less than if step (a) were practiced with an identical string having no surface texturing.

3. A method as recited in claim 1 wherein step (a) is practiced by rotating one or more strings having a second axis that is 85% of or less than the length of the first axis.

4. A method as recited in claim 1 wherein step (a) is practiced by rotating at least one generally tear drop cross-section string.

5. A method as recited in claim 4 wherein the tear drop cross-section string has a larger more rounded end, and a smaller more pointed end; and wherein step (a) is practiced by rotating the string so that the larger more rounded end provides the cutting edge of the string, and step (b) is practiced so that the larger more rounded end comes into first contact with the vegetation.

6. A method as recited in claim 1 wherein the at least one string comprises a plurality of elongated flexible strings each having a first axis which is the strongest axis and has the highest moment of inertia, and a second, weaker, axis, and wherein step (a) is practiced to rotate all of said plurality of strings so that the first axis of each is maintained and moves in substantially the same predefined cutting plane and so that the drag coefficient thereof is 1.0 or less.

7. A method as recited in claim 6 wherein the plurality of strings comprises at least four strings, and wherein step (a) is practiced to rotate the at least four strings with the first axis of each in substantially the same cutting plane, or wherein the plurality of strings comprises at least three strings, and wherein step (a) is practiced to rotate the at least three strings with the first axis of each in substantially the same cutting plane using an approximately 25 cc two cycle gasoline powered engine, or equivalent four cycle engine.

8. A method as recited in claim 1 wherein at least in part the string is maintained moving in the predefined cutting plane during the practice of step (a) by providing a rotating head, with an eyelet through which the string extends, the eyelet having substantially an identical cross-sectional configuration to the string; and wherein step (a) is also practiced by powering the rotating head with a power source.

9. A method as recited in claim 8 wherein (a) is practiced so that the drag coefficient of the string is 0.8 or less.

10. A method as recited in claim 1 wherein at least in part the string is maintained moving in the predefined cutting plane during the practice of step (a) by providing a rotating head, and providing a compound taper of the string so that the string has a larger cross-sectional dimension at the rotating head, and a smaller cross-sectional dimension at a free end thereof removed from the rotating head; and wherein step (a) is also practiced by powering the rotating head with a power source.

11. A method as recited in claim 10 wherein (a) is practiced so that the drag coefficient of the string is 0.8 or less.

12. A method as recited in claim 1 wherein (a) is practiced so that the drag coefficient of the string is 0.35 or less.

13. A method as recited in claim 1 wherein (a) is practiced so that the drag coefficient of the string is 0.8 or less.

14. A method of cutting vegetation using one or more elongated substantially non-metallic flexible elongated strings having an aerodynamic profile in a cutting plane, said method comprising the steps of:

(a) rotating the one or more substantially non-metallic flexible elongated strings about a common axis of rotation in a direction of movement so that the aerodynamic profile of each string moves in a substantially common cutting plane in the direction of movement using a rotating head so as to use less than the theoretical equivalent of 0.4 horsepower per string at about 8000 rpm for a 17 inch swath, and a 4.5 inch diameter of rotating head, and each string having a dimension perpendicular to the direction of movement in the cutting plane of about 0.08 inches; and (b) bringing the one or more rotating strings into contact with vegetation so that the common cutting plane is generally transverse to a portion of the vegetation to be cut, and the string cuts the vegetation.

15. A method as recited in claim 14 wherein step (a) is practiced by providing the rotating head, with an eyelet for each string through which the string extends, the eyelet having substantially an identical cross-sectional configuration to the string; and by powering the rotating head with a power source so that the head rotates, at least when the one or more strings are not in contact with vegetation, at the equivalent of between about 6000–9000 rpm for a 17 inch swath.

16. A method as recited in claim 14 wherein step (a) is practiced by rotating a plurality of strings at the same time.

17. A method as recited in claim 14 wherein steps (a) and (b) are practiced by rotating at least three strings.

18. A method of cutting vegetation using at least one elongated flexible string, said method comprising:

(a) rotating the at least one elongated string about an axis of rotation so that the drag co-efficient of the string is 1.0 or less as the string moves in a cutting plane; and (b) bringing the at least one rotating string into contact with vegetation so that the cutting plane is generally transverse to a portion of the vegetation to be cut and the string cuts the vegetation.

19. A method as recited in claim 18 wherein (a) is practiced so that the drag coefficient of the string is 0.8 or less.

20. A method as recited in claim 18 wherein (a) is practiced so that the drag coefficient of the string is 0.35 or less.

* * * * *